US012730819B2

(12) United States Patent
Granieri et al.

(10) Patent No.: US 12,730,819 B2
(45) Date of Patent: Sep. 8, 2026

(54) GESTURE-BASED SEARCH SYSTEMS AND METHODS FOR VEHICLES THAT OUTPUT PRIMARY AND SECONDARY SEARCH RESULTS

(71) Applicant: Toyota Jidosha Kabushiki Kaisha, Toyota (JP)

(72) Inventors: Alexander Charles Granieri, Mountain View, CA (US); Jimmy Chiu, San Jose, CA (US); Brian Robert Hilnbrand, San Jose, CA (US); Jun Jiang, Sunnyvale, CA (US); Navid Fattahi, San Jose, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 19/062,129

(22) Filed: Feb. 25, 2025

(65) Prior Publication Data

US 2026/0252570 A1 Aug. 27, 2026

(51) Int. Cl.
*G06F 16/2457* (2019.01)
*G06F 16/248* (2019.01)

(52) U.S. Cl.
CPC ...... *G06F 16/24575* (2019.01); *G06F 16/248* (2019.01)

(58) Field of Classification Search
CPC ......................... G06F 16/24575; G06F 16/248
See application file for complete search history.

(56) References Cited

U.S. PATENT DOCUMENTS 8,498,984 B1 * 7/2013 Hwang ............... G06F 16/9538 707/723
8,886,399 B2 * 11/2014 El Dokor ............... G06F 3/005 345/158
9,541,418 B2 * 1/2017 El Dokor .............. G06V 20/20
9,891,716 B2 * 2/2018 El Dokor .............. G06V 40/10
10,026,400 B2 7/2018 Gelfenbeyn et al.
(Continued)

FOREIGN PATENT DOCUMENTS

DE 102016011916 A1 6/2017

OTHER PUBLICATIONS

Pending U.S. Appl. No. 18/403,139, filed Jan. 3, 2024.
(Continued)

*Primary Examiner* — Jorge A Casanova
(74) *Attorney, Agent, or Firm* — Christopher G. Darrow; Darrow Mustafa PC

(57) ABSTRACT

Systems, methods, and other embodiments described herein relate to gesture-based searching in a vehicle. In one embodiment, a vehicle-based search system, in response to detecting a gesture performed by an occupant of a vehicle, correlates the gesture with a target. The system also constructs a search query based on the target correlated with the gesture and an occupant request. The system also executes the search query to acquire search results. The system also processes the search results to generate primary search results and secondary search results. The primary and secondary search results are different in scope. The system also communicates the primary and secondary search results to the occupant via a primary output device and a secondary output device, respectively, to provide assistance to the occupant pertaining to the target.

14 Claims, 15 Drawing Sheets

(56) References Cited

U.S. PATENT DOCUMENTS

| | | | | |
|---|---|---|---|---|
| 10,073,535 | B2 | 9/2018 | Vaghefinazari et al. | |
| 10,222,226 | B2 | 3/2019 | Rosario | |
| 10,732,622 | B2 | 8/2020 | Bettger et al. | |
| 10,861,459 | B2 | 12/2020 | Lee et al. | |
| 10,997,570 | B1 | 5/2021 | Kurani et al. | |
| 11,037,556 | B2 | 6/2021 | Rangarajan et al. | |
| 11,275,447 | B2 | 3/2022 | Vaghefinazari et al. | |
| 11,321,688 | B1 | 5/2022 | Kurani et al. | |
| 11,630,874 | B2 | 4/2023 | Mabotuwana et al. | |
| 11,657,377 | B1 | 5/2023 | Kurani et al. | |
| 11,972,404 | B2 | 4/2024 | Kurani et al. | |
| 2005/0273218 | A1* | 12/2005 | Breed | G06K 7/10178 701/2 |
| 2014/0019522 | A1 | 1/2014 | Weng et al. | |
| 2014/0040813 | A1* | 2/2014 | McDonald | G06F 16/338 715/781 |
| 2014/0121883 | A1 | 5/2014 | Shen et al. | |
| 2014/0142948 | A1 | 5/2014 | Rathi et al. | |
| 2016/0006922 | A1* | 1/2016 | Boudreau | H04N 23/661 348/207.1 |
| 2016/0026253 | A1* | 1/2016 | Bradski | H04N 13/128 345/8 |
| 2016/0030426 | A1 | 2/2016 | Tester et al. | |
| 2016/0039426 | A1 | 2/2016 | Ricci | |
| 2016/0335328 | A1* | 11/2016 | Lampert | G06F 16/00 |
| 2017/0097243 | A1 | 4/2017 | Ricci | |
| 2017/0200449 | A1 | 7/2017 | Penilla et al. | |
| 2018/0046851 | A1 | 2/2018 | Kienzle et al. | |
| 2019/0302895 | A1 | 10/2019 | Jiang et al. | |
| 2021/0256933 | A1 | 8/2021 | Kurebayashi et al. | |
| 2023/0110773 | A1 | 4/2023 | Ahn et al. | |
| 2023/0281254 | A1 | 9/2023 | Kocienda et al. | |
| 2023/0281580 | A1 | 9/2023 | Kurani et al. | |
| 2024/0045499 | A1* | 2/2024 | Watanabe | G06F 3/011 |
| 2024/0281778 | A1 | 8/2024 | Kurani et al. | |
| 2024/0289407 | A1 | 8/2024 | Rofouei et al. | |
| 2025/0013683 | A1 | 1/2025 | Granieri et al. | |
| 2025/0074475 | A1 | 3/2025 | Sundaram et al. | |
| 2025/0284735 | A1 | 9/2025 | Wan et al. | |
| 2025/0292687 | A1* | 9/2025 | Pathak | G06V 20/586 |
| 2025/0348702 | A1* | 11/2025 | Aggarwal | G06N 3/006 |

OTHER PUBLICATIONS

Non-final Office Action for U.S. Appl. No. 18/403,139, mailed on Oct. 21, 2024 (18 pages).

Reitelshöfer et al. "Recognition and description of unknown everyday objects by using an image based meta-search engine for service robots." Advanced Engineering Forum. vol. 19. Trans Tech Publications Ltd, 2016. 7 pages. Available at: https://acrobat.adobe.com/id/urn:aaid:sc:VA6C2:54f73afe-76c1-4307-9e08-410c7bc59c16.

Lee et al. "GazePointAR: A Context-Aware Multimodal Voice Assistant for Pronoun Disambiguation in Wearable Augmented Reality." Proceedings of the CHI Conference on Human Factors in Computing Systems. 2024.

Wang et al. "What's this?: Understanding User Interaction Behaviour with Multimodal Input Information Retrieval System." Adjunct Proceedings of the 26th International Conference on Mobile Human-Computer Interaction. 2024. 7 pages.

Pending U.S. Appl. No. 19/062,135, filed Feb. 25, 2025.

U.S. Appl. No. 63/525,343, filed Jul. 6, 2023 to Granieri.

U.S. Appl. No. 63/590,822, filed Oct. 17, 2023 to Hilnbrand.

Final Office Action for U.S. Appl. No. 18/403,139, mailed on Mar. 27, 2025 22 pages.

Wiederer et al. "Traffic control gesture recognition for autonomous vehicles." 2020 IEEE/RSJ International Conference on Intelligent Robots and Systems (IROS). IEEE, 2020.

Kim, "Memorandum: Advance notice of change to the MPEP in light of Ex Parte Desjardins" Dec. 5, 2025.

Non-final Office Action for U.S. Appl. No. 19/062,135, mailed on Oct. 6, 2025, 32 pages.

* cited by examiner

GESTURE-BASED SEARCH SYSTEMS AND METHODS FOR VEHICLES THAT OUTPUT PRIMARY AND SECONDARY SEARCH RESULTS

TECHNICAL FIELD

The subject matter described herein relates, in general, to searching within vehicles and, more particularly, to gesture-based search systems and methods for vehicles that output primary and secondary search results.

BACKGROUND

Occupants traveling in vehicles may use electronic devices, such as mobile phones, to conduct map-based searches, for example, to search for nearby restaurants or other points of interest. Such map-based searches, however, use rigid processes that do not account for contextual aspects associated with a vehicle moving through an environment. For example, though a search may be conducted according to the current location of the vehicle and its occupant(s), the search does not account for further contextual aspects beyond simple search terms. Also, conventional vehicle-based search systems that detect and interpret user gestures (e.g., finger pointing) in identifying the subject (target) of a search do not take full advantage of that capability, rendering such systems unnecessarily difficult for the occupant to use. Moreover, the manner in which such systems communicate search results to occupants is not as convenient and helpful as it could be.

SUMMARY

An example of a vehicle search system is presented herein. The system comprises a processor and a memory storing machine-readable instructions that, when executed by the processor, cause the processor to, in response to detecting a gesture performed by an occupant of a vehicle, correlate the gesture with a target. The memory also stores machine-readable instructions that, when executed by the processor, cause the processor to construct a search query based on the target correlated with the gesture and an occupant request. The memory also stores machine-readable instructions that, when executed by the processor, cause the processor to execute the search query to acquire search results. The memory also stores machine-readable instructions that, when executed by the processor, cause the processor to process the search results to generate primary search results and secondary search results. The primary and secondary search results are different in scope. The memory also stores machine-readable instructions that, when executed by the processor, cause the processor to communicate the primary and secondary search results to the occupant via a primary output device and a secondary output device, respectively, to provide assistance to the occupant pertaining to the target.

Another embodiment is a non-transitory computer-readable medium for vehicle-based searching storing instructions that, when executed by a processor, cause the processor to, in response to detecting a gesture performed by an occupant of a vehicle, correlate the gesture with a target. The instructions also cause the processor to construct a search query based on the target correlated with the gesture and an occupant request. The instructions also cause the processor to execute the search query to acquire search results. The instructions also cause the processor to process the search results to generate primary search results and secondary search results. The primary and secondary search results are different in scope. The instructions also cause the processor to communicate the primary and secondary search results to the occupant via a primary output device and a secondary output device, respectively, to provide assistance to the occupant pertaining to the target.

In another embodiment, a method of vehicle-based searching is disclosed. The method comprises, in response to detecting a gesture performed by an occupant of a vehicle, correlating the gesture with a target. The method also includes constructing a search query based on the target correlated with the gesture and an occupant request. The method also includes executing the search query to acquire search results. The method also includes processing the search results to generate primary search results and secondary search results. The primary and secondary search results are different in scope. The method also includes communicating the primary and secondary search results to the occupant via a primary output device and a secondary output device, respectively, to provide assistance to the occupant pertaining to the target.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 6A illustrates an example of an occupant performing a map-based search in a vehicle.

FIG. 7A illustrates an example of an occupant performing a search based on physical aspects of the vehicle.

FIG. 9A illustrates an example of an occupant performing a gesture-based search regarding an object in the environment.

DETAILED DESCRIPTION

Figure 1:
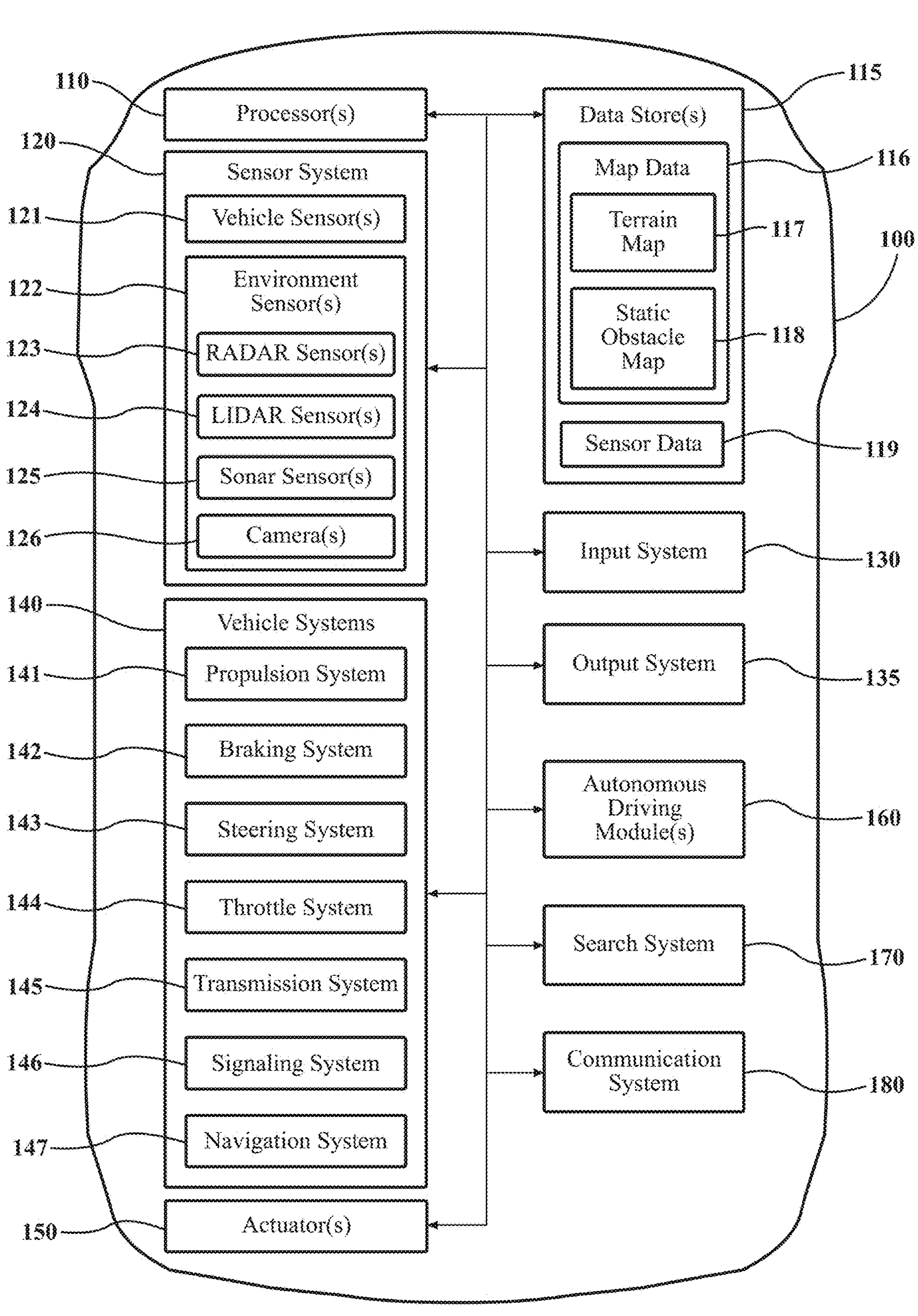
FIG. 1 illustrates one embodiment of a vehicle within which systems and methods disclosed herein may be implemented.

Systems, methods, and other embodiments associated with improving searching within vehicles are disclosed herein. In one embodiment, example systems and methods relate to a manner of improving searching systems for vehicles. As previously noted, a system may encounter difficulties with the accuracy of search results due to a failure to account for further contextual aspects beyond the input search terms. Therefore, search results may not be accurate or relevant to an occupant's search in light of its context. As also previously noted, conventional vehicle-based search systems that detect and interpret user gestures in identifying the target, in the environment, of a search do not take full advantage of that capability, rendering such systems unnecessarily difficult for the occupant to use.

Accordingly, a search system for a vehicle is configured to acquire data that informs the context of the search. The data includes, in some instances, sensor data regarding the external environment of the vehicle, including traffic conditions, weather conditions, objects and/or areas of interest in the external environment, etc. The data also includes, in some instances, sensor data regarding the internal environment of the vehicle, for example, data regarding the number of occupants in the vehicle, the location of the occupant(s), the mood of the occupant(s) (informed by facial and/or voice characterization), etc. The data can also include data regarding the vehicle itself, for example, the speed, heading, and/or location of the vehicle. In some instances, the data also includes data from an occupant's personal electronic device, for example, the occupant's calendar, text messages, phone calls, contact list, etc. The data also includes any other data that may inform the overall context of a search.

In some embodiments, the search system may accept searches by detecting a gesture and a request that form the search. The gesture, in one approach, is a pointing gesture performed by the occupant directed at an object and/or area of interest in the external environment. In another approach, the gesture is a pointing gesture performed by the occupant directed at a feature of the vehicle itself (i.e., an object in the internal environment—the vehicle's passenger compartment). While the gesture is described in these examples as a pointing gesture, the occupant can perform gestures with another body part, for example, a shoulder, a head, eyes, etc. The additional portion of the search, the request, in one approach, is a question asked by the occupant about the object and/or area of interest. Moreover, in another approach, the request can be a command, for example, a command to return more information about the object and/or area of interest. While the request can be spoken by the occupant, the request may take another form, such as a textual request input to a user interface of the vehicle. In any case, the search system acquires contextual information from the gesture in order to relate the request to the surroundings of the occupant.

Upon detection of a gesture and request, in one approach, the search system defines the context of the search based on the acquired data. Additionally, upon detection of the gesture and request, the search system, in one approach, correlates the gesture with the surrounding environment of the occupant. More specifically, in one example, the search system transforms the gesture into a digital projection and overlays the projection onto the surrounding environment. Once the search system has overlayed the projection on the data, the search system can then identify points-of-interest in the surrounding environment that are located within the projection.

In some embodiments, rather than relying on map data to identify points-of-interest or other features of the environment, the search system analyzes one or more images of the portion of the environment located within the projection to identify a target (subject) of the search. For example, an occupant might point at a restaurant and ask, "What kind of online rating does that restaurant have?" In response to the gesture and occupant request, the search system captures, via a vehicle camera, an image of the external environment that includes the restaurant at which the occupant pointed. The search system analyzes the captured image using machine-vision algorithms (e.g., semantic segmentation, object detection, object recognition, etc.) to determine that the image includes a restaurant and, in some embodiments, identifies the specific restaurant (e.g., by analyzing the sign bearing the restaurant's name). The search system uses the information derived from the captured image(s) in different ways, depending on the embodiment. In some embodiments, the search system performs a reverse image search based on the portion of the captured image that includes the target. As those skilled in the art area aware, a reverse image search involves searching for information based on the image data (pixels) themselves using a generative-artificial-intelligence-based model (generative-AI-based model). Such a search thus involves searching based on image data rather than text. In some embodiments, a captured image is used in connection with the search system requesting that the occupant confirm the target before the search query is executed, as explained in greater detail below.

In some embodiments, the search system previews (presents), to the occupant, the tentative target identified via a captured image or other sensor data. In these embodiments, the search system requests confirmation of the target from the occupant before performing a search. For example, the system can output an audible computer-synthesized natural-language question or statement to the occupant to request confirmation. For example, the confirmation can be a spoken natural-language reply from the occupant or the actuation of a user-interface element of the vehicle. More specifically, in response to the occupant pointing at a business and asking, “What time do they close today?”, for example, the search system analyzes the gesture, captures an image of the environment encompassing where the occupant pointed or otherwise gestured, and, by analyzing the captured image, identifies a business called “Aimée's Boutique.” The search system then asks the occupant, “Do you mean Aimée's Boutique?” The occupant responds, “Yes, that's what I meant.” Once the search system has received this confirmation of the target, the search system executes a search query based on the confirmation of the target and the occupant's request (“What time do they close today?”).

In other embodiments, the search system previews the tentatively identified target to the occupant by displaying a captured image of the environment (external or internal) that includes the target and outputting an associated computer-synthesized natural-language question or statement such as, “Please glance at the image. Is this the business you meant?” The occupant can then respond with a simple natural-language response such as, “Yes, that's the one,” or the occupant can actuate a user-interface element (icon, button, knob, switch, etc.) of the vehicle to confirm.

In some situations, an occupant might gesture and utter a request that the search system cannot resolve with high confidence due to inherent ambiguity. For example, an occupant might gesture toward a bicycle in a cluster of several bicycles parked on a bicycle rack and ask, “What kind of bike is that?” In these situations, the search system can disambiguate the occupant's gesture and spoken request through follow-up natural-language dialogue (e.g., “I noticed that there are five bikes on that rack. Which one do you mean?”) or by displaying, on a touch-responsive display of the vehicle, an image that includes the plurality of objects of like type or category (e.g., the cluster of parked bicycles) and asking the occupant to touch or tap the display at a location within the displayed image that corresponds to the intended target. Thus, in some embodiments that include requesting and obtaining occupant confirmation of the target prior to searching, disambiguation of the target can also be performed.

Once the search system has gathered the requisite information, the search system constructs a search query. For example, in some embodiments, the search system constructs the search query based on the defined context, the target correlated with the occupant's gesture, and the occupant's request. In other words, the search query can include contextual clues and can be directed to the points-of-interest or other target within the digital projection. In embodiments that include occupant confirmation of the target before the search is executed, the search system constructs the search query based on the confirmation of the target received from the occupant and the occupant's request. In those embodiments, contextual information can also be included in the search query. As mentioned above, in some embodiments, a captured image of the environment that includes the confirmed target is used as the basis for constructing a search query that includes a reverse image search. That is, the search query can be based on the confirmation of the target, the occupant's request, and a reverse image search of the portion of the captured image that corresponds to the confirmed target.

Subsequent to construction of the search query, the search system then executes the search query. In one example, the search system executes the search query by inputting the search query to a multi-modal generative-AI-based model (e.g., a model that includes one or more language-based neural networks). As those skilled in the art will recognize, “multi-modal” refers to the generative-AI-based model being capable of processing, for example, audio, text, and image inputs in combination.

The search system also executes the search query to acquire search results and to communicate the search results to the occupant to provide assistance to the occupant pertaining to the target. Accordingly, the systems and methods disclosed herein provide the benefit of constructing search queries that return more accurate and/or relevant results to an occupant of a vehicle who performs a gesture-based search. Moreover, the inclusion of occupant confirmation improves the accuracy and relevance of the search results by ensuring that the target is correct (the target the occupant intended) before the search query is executed.

An additional objective of some embodiments of a vehicle-based search system described herein is to avoid distracting the driver of the vehicle with detailed, potentially complex search results. For example, filling a vehicle display with textual search results is not helpful to a driver because the driver needs to remain focused on the roadway, traffic, controlling the vehicle, etc. Similarly, a long computer-synthesized audible recitation of search results can also be distracting to a driver and potentially annoying to passengers. To address this problem, some embodiments of a vehicle-based search system process the search results to generate primary search results and secondary search results. Importantly, the primary and secondary search results are different in scope. For example, the primary search results might be a succinct (e.g., one-sentence), high-level statement that includes the most important information sought by the occupant (e.g., a driver or passenger), and the secondary search results might include more detail—in some embodiments, significantly more detail. The additional detail can assist an occupant who is attempting to research a particular topic while driving or riding in a vehicle.

In these embodiments, the search system communicates the primary and secondary search results to the occupant via a primary output device and a secondary output device, respectively. For example, the primary output device, in one embodiment, is an output system of the vehicle, and the secondary output device is, without limitation, a cloud server, an occupant mobile device, an occupant laptop computer, or an occupant desktop computer. In some embodiments, the secondary output device is the output system of the vehicle just mentioned, and the user can read or listen to detailed secondary search results via the output system of the vehicle but only after the vehicle is parked, for safety reasons.

The assistance and advantages these embodiments provide to the occupant include the ability of the occupant to look at or listen to the primary and/or secondary search results at the occupant's convenience. For example, in one embodiment, the occupant can read or listen to the detailed secondary search results on a mobile device such as a smartphone or tablet computer long after the original search query was executed and after the occupant has exited the vehicle. This enables the occupant to read or listen to the detailed secondary search results at a time and at a location that is convenient for the occupant.

Some embodiments include an additional feature: receiving a natural-language request from the occupant to capture an image of a particular portion of the external or internal environment of the vehicle, capturing the image in accordance with the natural-language request from the occupant, and transmitting the captured image to a secondary output device. For example, a vehicle occupant might see a beautiful sunset and ask the search system to capture an image of the sunset and to transmit the image to the occupant's designated secondary device (e.g., the occupant's smartphone). Similarly, an occupant might ask the search system to capture a selfie of the vehicle occupants using a passenger-compartment camera and to transmit the image to a designated secondary device (e.g., occupant's mobile device or a cloud server where the occupant stores personal photos).

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be another form of motorized transport that may be human-operated or otherwise interface with human passengers. In another aspect, the vehicle 100 includes, for example, sensors to perceive aspects of the surrounding environment, and thus benefits from the functionality discussed herein associated with vehicular search systems.

The vehicle 100 also includes various elements. It will be understood that in various embodiments it may not be necessary for the vehicle 100 to include all the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described in connection with subsequent figures. However, a description of many of the elements in FIG. 1 will be provided after the discussion of FIGS. 2-13B for purposes of brevity of this description. Additionally, it will be appreciated that, for simplicity and clarity of illustration, reference numerals have, in some instances, been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

As shown in FIG. 1, the vehicle 100 includes a search system 170 that is implemented to perform methods and other functions disclosed herein relating to improving vehicular search systems in the ways described above. Those techniques are described in further detail below. In general, as used herein, "context" refers to the interrelated conditions in which an occupant uses the search system 170 within the vehicle, and "contextually-based" describes the use of available information regarding the interrelated conditions, such as the external or internal environment of the vehicle 100, the emotional state of occupant(s) of the vehicle 100, information about calendar events of occupants of the vehicle 100, information about the operation of the vehicle 100 itself, and so on. The search system 170 functions to use the contextually-based information to improve search processes and, as a result, provide more accurate/relevant information to the occupant(s), as described further below.

In some embodiments, the search system 170 is implemented partially within the vehicle 100 and partially as a cloud-based service. For example, in one approach, functionality associated with at least one module of the search system 170 is implemented within the vehicle 100, and additional functionality is implemented within a cloud-based computing system. Thus, the search system 170 may include a local instance at the vehicle 100 and a remote instance that functions within the cloud-based environment.

Moreover, the search system 170, as provided for within the vehicle 100, functions in cooperation with a communication system 180. In one embodiment, the communication system 180 communicates according to one or more communication standards. For example, the communication system 180 can include multiple different antennas/transceivers and/or other hardware elements for communicating at different frequencies and according to respective protocols. The communication system 180, in one arrangement, communicates via a communication protocol, such as a Wi-Fi, DSRC, V2I, V2V, or another suitable protocol for communicating between the vehicle 100 and other entities in the cloud environment. Moreover, the communication system 180, in one arrangement, further communicates according to a protocol, such as global system for mobile communication (GSM), Enhanced Data Rates for GSM Evolution (EDGE), Long-Term Evolution (LTE), 5G, or another communication technology that provides for the vehicle 100 communicating with various remote devices (e.g., a cloud-based server). The search system 170 can leverage various wireless communication technologies to provide communications to other entities, such as members of the cloud-computing environment.

As shown in FIG. 1, the vehicle 100, in some embodiments, includes an input system 130. The input system 130 generally encompasses one or more devices that enable the acquisition of information by various computerized subsystems of vehicle 100 from an outside source, such as an occupant (user). For example, the input system 130 can receive an input from a vehicle passenger (e.g., a driver/operator and/or a passenger). The input system 130 can include components such as, without limitation, microphones, touchscreens, knobs, buttons, sliders, levers, and rotary dials. Those components can be associated with the user interfaces of various vehicle subsystems, including a search system 170.

As also shown in FIG. 1, the vehicle 100, in some embodiments, includes an output system 135. The output system 135 includes, for example, one or more devices that enable information/data to be provided to occupants, another vehicle, another electronic device, etc. Such devices can include, without limitation, In-Vehicle-Information-System (IVIS) displays (including touchscreens), head-up displays (HUDs), audio amplifiers, audio speakers, and indicator lights. In some embodiments, the output system 135 can interface with vehicle occupants' mobile devices (e.g., smartphones, tablet computers, etc.). For example, search results from search system 170 can be output to such a mobile device, in some embodiments.

Figure 2:
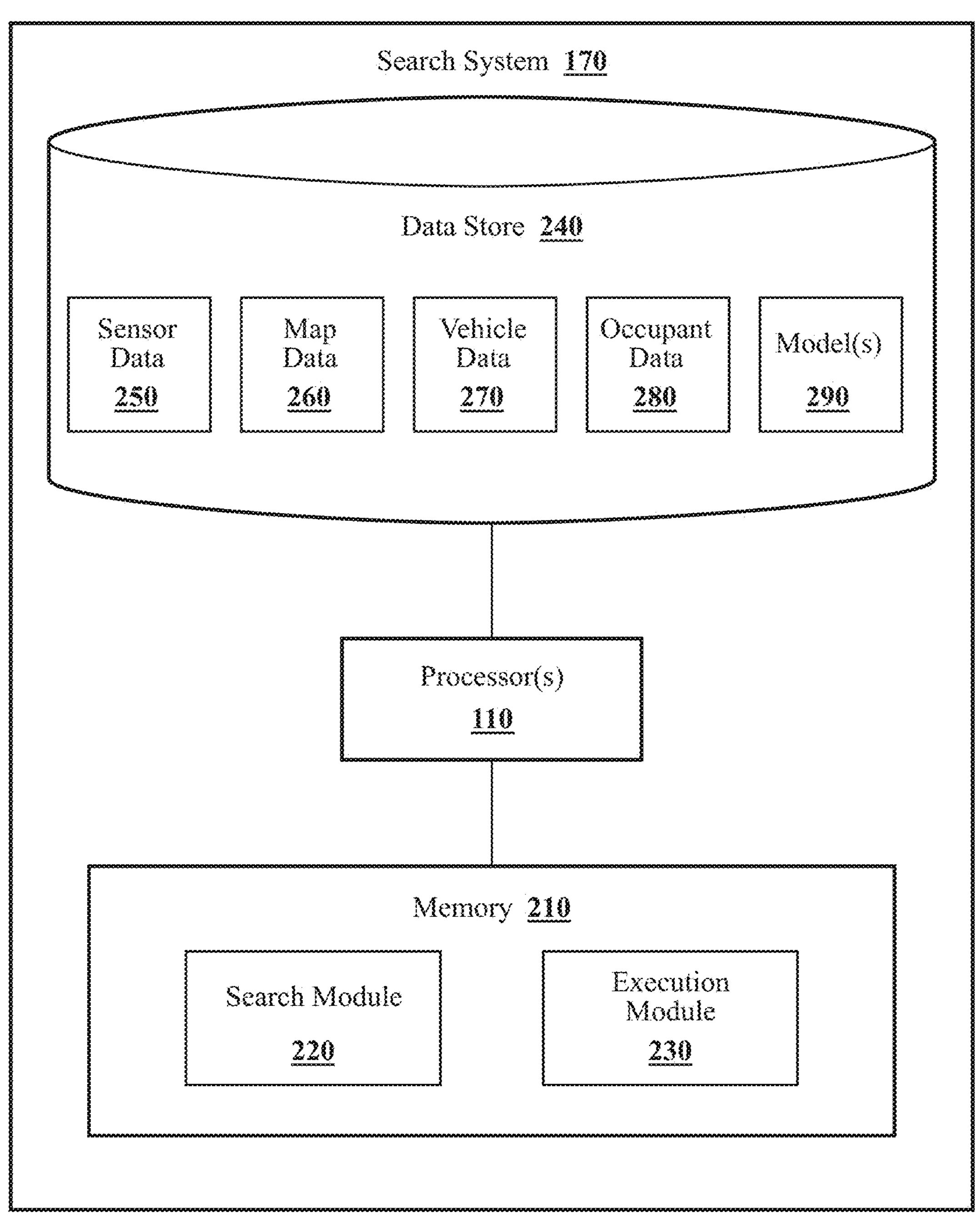
FIG. 2 illustrates one embodiment of a system that is associated with context-based searching within a vehicle.

With reference to FIG. 2, one embodiment of the search system 170 of FIG. 1 is further illustrated. The search system 170 is shown as including one or more processors 110 from the vehicle 100 of FIG. 1. Accordingly, the one or more processors 110 may be a part of the search system 170, the search system 170 may include one or more separate processors from the one or more processors 110 of the vehicle 100, or the search system 170 may access the one or more processors 110 through a data bus or another communication path. In one embodiment, the search system 170 includes a memory 210 that stores a search module 220 and an execution module 230. The memory 210 is a random-access memory (RAM), read-only memory (ROM), a hard-disk drive, a flash memory, or other suitable memory for storing the modules 220 and 230. The modules 220 and 230 are, for example, machine-readable instructions that, when executed by the one or more processors 110, cause the one or more processors 110 to perform the various functions disclosed herein. In alternative arrangements, the modules 220 and 230 are independent elements from the memory 210 that are, for example, comprised of hardware elements. Thus, the modules 220 and 230 are alternatively ASICs, hardware-based controllers, a composition of logic gates, or another hardware-based solution.

In the embodiment of FIG. 2, the search system 170 is implemented within a vehicle 100. In other embodiments, such as that illustrated in FIG. 3, the functionality of the search system 170 is divided between a vehicle 100 and a cloud-computing environment 300. For example, in one embodiment, search system 170 includes sufficient capabilities to construct a search query, but the search query is then transmitted to and executed by the portion of the search system 170 that is implemented at the cloud-computing environment 300. Subsequently, the search results are transmitted from the cloud-computing environment 300 to the portion of the search system 170 that is implemented in the vehicle 100, which outputs the search results to the occupant.

Figure 3:
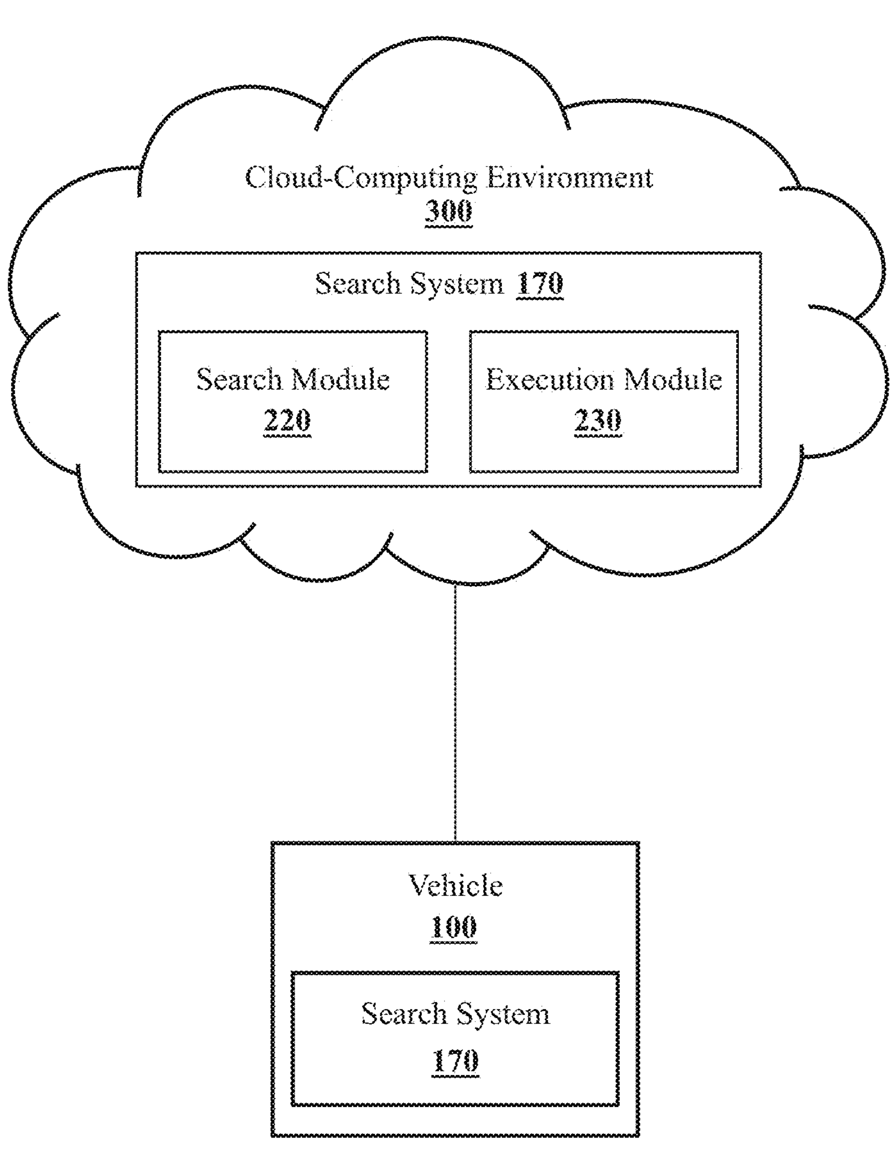
FIG. 3 illustrates one embodiment of the system of FIG. 2 in a cloud-computing environment.

Accordingly, as shown in FIG. 3, the search system 170 may include separate instances within one or more entities of the cloud-based environment 300 such as servers and also instances within one or more remote devices (e.g., vehicles) that function to acquire, analyze, and distribute the noted information. In a further aspect, the entities that implement the search system 170 within the cloud-based environment 300 may vary beyond transportation-related devices and encompass mobile devices (e.g., smartphones) and other devices that, for example, may be carried by an individual within a vehicle and that can function in cooperation with the vehicle 100. Thus, the set of entities that function in coordination with the cloud-environment 300 may be varied.

With continued reference to FIG. 2, in one embodiment, the search system 170 includes a data store 240. The data store 240 is, in one embodiment, an electronic data structure that is part of or separate from memory 210 in which various kinds of data and information, including machine-readable instructions, can be stored and organized. Thus, in one embodiment, the data store 240 stores data used by the modules 220 and 230 in executing various functions. In one embodiment, the data store 240 stores sensor data 250, map data 260, vehicle data 270, occupant data 280, and model(s) 290.

The sensor data 250 may include various kinds of perceptual data from sensors of a sensor system 120 of the vehicle 100. For example, the search module 220 of the search system 170 generally includes instructions that function to control the processor 110 to receive data inputs from one or more sensors of the vehicle 100. The inputs are, in one embodiment, perceptions of one or more objects in an external environment proximate to the vehicle 100 and/or other aspects of the surroundings, perceptions from within the passenger compartment of the vehicle 100, and/or perceptions concerning the vehicle 100 itself, such as the operational states of internal vehicle systems. As provided for herein, the search module 220, in one embodiment, acquires sensor data 250 that includes perceptions of occupants within the vehicle 100, including, for example, a driver and passengers. The search module 220 may further acquire, from one or more cameras 126, perceptions of the external environment surrounding the vehicle 100, inertial measurement unit(s) concerning forces exerted on the vehicle 100, etc. In further arrangements, the search module 220 acquires sensor data 250 from additional sensors such as radar sensor(s) 123, LiDAR sensor(s) 124, and other sensors in connection with deriving a contextual understanding of the vehicle 100, its occupants, and the external or internal environment of the vehicle 100.

In addition to the locations of surrounding vehicles and other objects in the external environment and information regarding objects and conditions in the internal environment of vehicle 100, the sensor data 250 may also include, for example, information about lane markings, and so on. Moreover, the search module 220, in one embodiment, controls the sensors to acquire the sensor data 250 about an area that encompasses 360 degrees about the vehicle 100 to provide a comprehensive assessment of the environment. Of course, in alternative embodiments, the search module 220 may acquire the sensor data about a forward direction alone when, for example, the vehicle 100 is not equipped with further sensors to include additional regions about the vehicle and/or the additional regions are not scanned due to other reasons (e.g., unnecessary due to known current conditions).

Accordingly, the search module 220, in one embodiment, controls the respective sensors to provide the data inputs in the form of the sensor data 250. Additionally, while the search module 220 is discussed as controlling the various sensors to provide the sensor data 250, in one or more embodiments, the search module 220 can employ other active or passive techniques to acquire the sensor data 250. For example, the search module 220 may passively sniff the sensor data 250 from a stream of electronic information provided by the various sensors to further components within the vehicle 100. Moreover, the search module 220 can undertake various approaches to fuse data from multiple sensors when providing sensor data 250 and/or sensor data acquired over a wireless communication link (e.g., V2V) from one or more of the surrounding connected vehicles and/or the cloud-based environment 300. Thus, the sensor data 250, in one embodiment, represents a combination of perceptions acquired from multiple sensors and/or other sources. The sensor data 250 may include, for example, information about facial features of occupants, points-of-interest surrounding the vehicle 100 (e.g., based on map data 260 or objects detected and recognized from captured image data), cloud-based content generated by a user (e.g., calendar data), and so on.

In one approach, the sensor data 250 also includes information regarding traffic conditions, weather conditions, objects in the external environment such as nearby vehicles, other road users (e.g., pedestrians, bicyclists, etc.), road signs, trees, animals, buildings, businesses, etc. As part of controlling the sensors to acquire the sensor data 250, it is generally understood that the sensors acquire the sensor data 250 of a region around the vehicle 100 with data acquired from different types of sensors generally overlapping in order to provide for a comprehensive sampling of the external environment at each time step. In general, the sensor data 250 need not be of the exact same bounded region in the surrounding environment but should include a sufficient area of overlap such that distinct aspects of the area can be correlated.

As mentioned above, the sensor data 250 also includes data regarding the internal environment of the vehicle 100, for example, the number of occupant(s) in the vehicle 100, where the occupant(s) are located within the vehicle 100, images of vehicle occupants (e.g., of an occupant gesture directed at a vehicle feature, etc.), temperature and light conditions within the vehicle 100, etc. Moreover, as mentioned above, in one approach, the search module 220 also controls the sensor system 120 to acquire sensor data 250 about the emotional state of the occupant(s) through, for example, image capture of the faces of the occupant(s) to perform facial recognition. The search module 220 may further capture voice information about the occupants, including speech, tone, syntax, prosody, posture, etc. In general, the search module 220 collects information to identify a mood (also referred to as an emotional state of the occupant(s) to make further assessments. In one approach, the search module 220 applies one of the models 290 to generate text from the audio that is then, for example, parsed into a syntax defining a search query.

As just mentioned, the search module 220, in one approach, acquires sensor data 250 to determine an emotional state of the occupants (e.g., driver and/or passenger(s)). Moreover, the search module 220 acquires sensor data 250 about additional aspects, including the surrounding environment not only to assess the emotional state but to determine general aspects of the surrounding, such as characteristics of surrounding objects, features, locations, and so on. For example, the search module 220 may identify surrounding businesses, objects (animate or inanimate), geographic features, current conditions, etc., from the collected sensor data 250.

In addition to sensing the external environment through the sensor data 250, in one approach, the search module 220 can also acquire map data 260 regarding the external environment. In one embodiment, the map data 260 includes map data 116 of FIG. 1, including data from a terrain map 117 and/or a static obstacle map 118. The map data 260 can be provided as two-dimensional map data or three-dimensional map data. In one embodiment, the search module 220 caches map data 260 relating to a current location of the vehicle 100 upon the initiation of the methods described herein. As the vehicle 100 continues to travel, the search module 220 can re-cache map data 260 in accordance with the vehicle's updated position.

In addition to sensor data 250 and map data 260, in one embodiment, the search module 220 also acquires vehicle data 270. In some instances, the vehicle data 270 is acquired through the sensor data 250 as mentioned above. For example, vehicle data 270 acquired through sensor data 250 can include the location of the vehicle 100 (for example, a map location of the vehicle 100), the heading of the vehicle 100, the speed of the vehicle 100, etc. Additionally or alternatively, vehicle data 270 can be retrieved from the data store 240, which may store data regarding the vehicle 100 itself, including the size, shape, and dimensions of the vehicle 100. Moreover, vehicle data 270 stored in the data store 240 may include a digital rendering of the vehicle 100 that provides a three-dimensional map of features of the vehicle 100, including locations of displays, buttons, seats, doors, etc. of the vehicle 100. In this way, the search module 220 can identify locations of features of the vehicle 100 to which an occupant may refer (e.g., via a gesture) when performing a search or executing an action.

Finally, in one configuration, the search module 220 also acquires occupant data 280. The occupant data 280 can include various information relating to the occupant(s) of the vehicle 100 that cannot be acquired from the sensor system 120. For example, the occupant data 280 can include information stored in one or more occupant profiles of the vehicle 100, information about preferences of the occupant(s), and/or information from one or more mobile devices (e.g., smartphones, personal tablets, smartwatches, etc.) associated with occupant(s) of the vehicle 100. In one embodiment, the occupant data 280 includes information about calendar events of the occupant(s). The occupant data 280 can further include other information relating to the occupant(s) that may inform the context of a search performed by one of the occupant(s) via the search system 170.

In one approach, the search module 220 implements and/or otherwise uses a machine learning algorithm. In one configuration, the machine learning algorithm is embedded within the search module 220, such as a convolutional neural network (CNN), to perform various perceptions approaches over the sensor data 250 from which further information is derived. Of course, in further aspects, the search module 220 may employ different machine learning algorithms or implements different approaches for performing the machine perception, which can include deep neural networks (DNNs), recurrent neural networks (RNNs), or another form of machine learning. Whichever particular approach the search module 220 implements, the search module 220 provides various outputs from the information represented in the sensor data 250. In this way, the search system 170 is able to process the sensor data 250 into contextual representations.

In some configurations, the search system 170 implements one or more machine learning algorithms. As described herein, a machine learning algorithm includes but is not limited to deep neural networks (DNN), including transformer networks, convolutional neural networks, recurrent neural networks (RNN), etc., Support Vector Machines (SVM), clustering algorithms, Hidden Markov Models, etc. It should be appreciated that the separate forms of machine learning algorithms may have distinct applications, such as agent modeling, machine perception, and so on. In some embodiments, search module 220 includes one or more generative-AI models such as large language models (LLMs), vision-language models (VLMs), and diffusion models. As mentioned above, some embodiments of the search module include one or more multi-modal generative-AI models that can accept and process multiple kinds of input data in combination (e.g., audio, video, and text) in connection with executing search queries.

Moreover, it should be appreciated that machine learning algorithms are generally trained to perform a defined task. Thus, the training of the machine learning algorithm is understood to be distinct from the general use of the machine learning algorithm, unless otherwise stated. That is, the search system 170 generally trains the machine learning algorithm according to a particular training approach, which may include supervised training, self-supervised training, reinforcement learning, and so on. In contrast to training/learning of the machine learning algorithm, the search system 170 implements the machine learning algorithm to perform inference. Thus, the general use of the machine learning algorithm is described as inference.

As discussed above, in some embodiments, search module 220 includes machine-readable instructions that, when executed by the one or more processors 110, cause the one or more processors 110 to, in response to detecting a gesture performed by an occupant of a vehicle 100, correlate the gesture with a target. As discussed above, a "target" is an object (animate or inanimate), location, building, vehicle feature/control, point-of-interest, etc., in the external or internal environment of a vehicle 100 to which the occupant's gesture refers. In other words, the search module 220 determines to what in the external or internal environment of vehicle 100 the occupant's gesture refers. Since the occupant's associated request also refers to the target, the occupant's request can also be correlated with the occupant's gesture to assist search module 220 in identifying the target. For example, if an occupant points at a building in a group of closely spaced buildings along the side of a roadway and says, "What time does that restaurant open for dinner?", search module 220 can combine geometric analysis of image data or other sensor data from sensor system 120 based on projection and overlaying, as described elsewhere herein, with the occupant's request that includes the keyword "restaurant" to determine that, of the five closely spaced businesses in the direction of the occupant's gesture, the one the occupant intended is "Ray's Steakhouse" because it is the only restaurant in the group of five businesses.

Search module 220 also includes machine-readable instructions that, when executed by the one or more processors 110, cause the one or more processors 110 to preview the target to the occupant and receive confirmation of the target from the occupant. That is, search module 220 requests confirmation of the target from the occupant before performing a search. For example, in some embodiments, the system generates and outputs an audible computer-synthesized natural-language question or statement to the occupant as a preview of the presumed target to request confirmation from the occupant. The occupant can then confirm the target through a spoken natural-language reply or through the actuation of a user-interface element of the vehicle (button, switch, lever, knob, icon, etc.), as explained above. In other embodiments, search module 220 previews the tentatively identified target to the occupant by displaying a captured image of the environment (external or internal) that includes the presumptive target and outputs an associated computer-synthesized natural-language question or statement to which the occupant responds in a natural-language format to confirm the target, as described above. Examples of use cases involving occupant confirmation are discussed below in connection with FIGS. 9A-9D.

As also described above, in some situations, an occupant might gesture and utter a request that the search module 220 cannot resolve with high confidence due to inherent ambiguity. In such situations, search module 220 can disambiguate the occupant's gesture through follow-up natural-language dialogue (e.g., the occupant provides a natural-language description of the intended target, such as, "I'm talking about the white car in the middle") or through asking the occupant to touch or tap a displayed image of a plurality of objects of like type or category to indicate the intended target among the plurality of similar objects. In summary, in some embodiments, in addition to requesting and obtaining confirmation of the target from the occupant, search module 220 can also interact with the occupant textually, audibly, visually, and/or tactilely to disambiguate the intended target.

Search module 220 also includes machine-readable instructions that, when executed by the one or more processors 110, cause the one or more processors 110 to construct a search query based on the confirmation of the target and an occupant request. As discussed above, once search module 220 has gathered the requisite information, search module 220 constructs a search query. For example, in some embodiments, the search system constructs the search query based on the defined context, the target correlated with the occupant's gesture, and the occupant's request. In other words, the search query can include contextual clues and can be directed to the points-of-interest or other target within the digital projection, based on sensor data 250.

In embodiments that include occupant confirmation of the target before the search is executed, the search system constructs the search query based on the confirmation of the target received from the occupant and the occupant's request. In some embodiments, contextual information can also be incorporated in the query, as in method 400 (refer to the discussion of FIG. 4 below). As discussed above, in some embodiments, a captured image of the environment that includes the confirmed target is used as the basis for constructing a search query that includes a reverse image search. That is, the search query can be based on the confirmation of the target, the occupant's request, and a reverse image search of the portion of the captured image that corresponds to the confirmed target. Again, contextual information can also be included in the search query, in some embodiments.

Search module 220 also includes machine-readable instructions that, when executed by the one or more processors 110, cause the one or more processors 110 to execute the search query to acquire search results. As discussed above, subsequent to construction of the search query, the search module 220 then executes the search query. In one example, the search module 220 executes the search query by inputting the search query to a multi-modal generative-AI-based model.

Search module 220 also includes machine-readable instructions that, when executed by the one or more processors 110, cause the one or more processors 110 to communicate the search results to the occupant to provide assistance to the occupant pertaining to the target. Accordingly, the systems and methods disclosed herein provide the benefit of constructing search queries that return more accurate and/or relevant results to an occupant of a vehicle who performs a gesture-based search. For example, an occupant can point at a business and ask, "What time does that store close today?" After correlating the occupant's gesture with a target (the business), previewing the target to the occupant, receiving confirmation of the target as being Max's Sporting Goods, constructing a search query, and executing the search query, the search module 220 can, through computer-synthesized natural-language speech, e.g., inform the occupant, "Max's Sporting Goods is open until 8 p.m. this evening." Such information permits the occupant to conduct a shopping trip more effectively and obtain needed merchandise.

Search module 220, in some embodiments, also includes machine-readable instructions that, when executed by the one or more processors 110, cause the one or more processors 110 to, in response to detecting the gesture performed by the occupant of the vehicle 100, capture an image that includes the target, as discussed above. The captured image can be used in various ways, depending on the embodiment. For example, such a captured image (e.g., captured by a camera 126 of the vehicle 100) can be used in previewing the target to the occupant and, if needed, in disambiguating the intended target, where the target is among a plurality of objects of like type or category, as discussed above.

In some embodiments of search system 170 that include occupant confirmation and image capture of a portion of the external or internal environment including the target, search system 170 further includes an execution module 230 with the functionality described in detail below in connection with FIG. 5.

Figure 4:
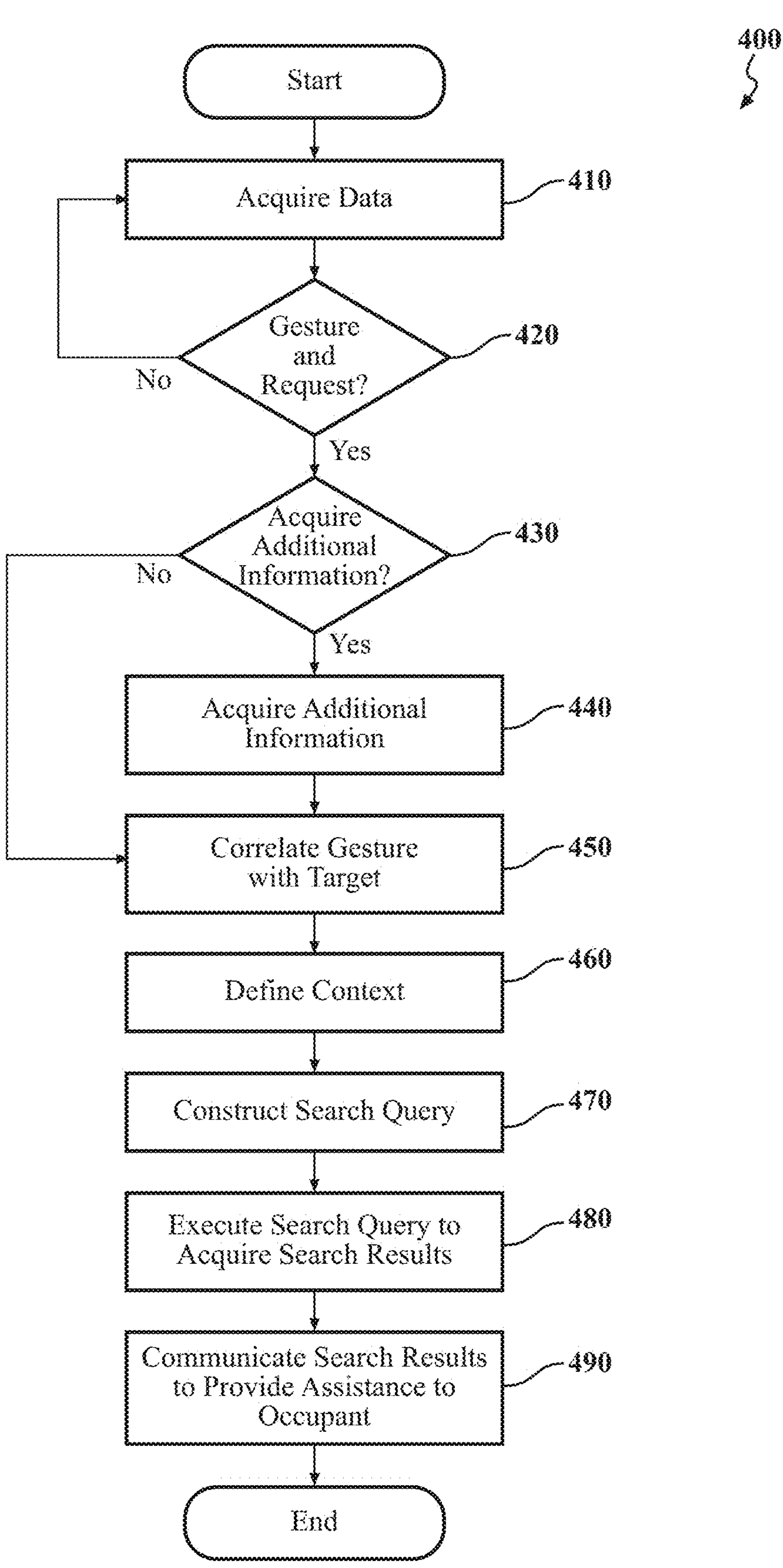
FIG. 4 illustrates a flowchart for one embodiment of a method that is associated with contextual searches within a vehicle.

Additional aspects of the search system 170 will be discussed in relation to FIGS. 4 and 5. FIGS. 4 and 5 illustrate flowcharts of methods 400 and 500 that are associated with vehicular searching, such as executing a search query and executing an action based on search results from a previously-executed search query. Methods 400 and 500 will be discussed from the perspective of the search system 170 of FIGS. 1-3. While methods 400 and 500 are discussed in connection with the search system 170, it should be appreciated that the methods 400 and 500 are not limited to being implemented within the search system 170 but that the search system 170 is instead one example of a system that may implement the methods 400 and 500.

FIG. 4 illustrates a flowchart of a method 400 that is associated with vehicular searching. At 410, the search module 220 acquires data. In one embodiment, the search module 220 acquires data including sensor data 250 collected using a sensor system 120 of the vehicle 100. As mentioned above, the sensor data 250 includes data relating to, for example, an external environment of the vehicle 100, an internal environment of the vehicle 100, and/or one or more occupants of the vehicle 100.

In some embodiments, the search module 220 acquires the data at successive iterations or time steps. Thus, the search system 170, in one embodiment, iteratively executes the functions discussed at 410 to acquire data and provide information therefrom. Furthermore, the search module 220, in one embodiment, executes one or more of the noted functions in parallel for separate observations to maintain updated perceptions. Additionally, as previously noted, the search module 220, when acquiring data from multiple sensors, fuses the data together to form the sensor data 250 and to provide for improved determinations of detection, location, and so on.

In some instances, the search module 220 uses the sensor data 250 to monitor for and determine whether an input is present from an occupant. An occupant may begin to perform a search within the vehicle 100, in one example, by gesturing towards object(s) and/or area(s) of the occupant's interest in the surrounding environment and speaking a command or a question (an occupant request) that forms the basis of a search.

At 420, the search module 220 uses cameras and/or other sensors within the vehicle 100 to detect when an occupant performs a gesture toward an area in the occupant's surrounding environment. In one embodiment, a gesture includes motion of a body part to indicate a direction in the surrounding environment of the occupant via, for example, a finger, a hand, an arm, a head, or eyes. The direction may be defined along a one-dimensional reference as an angle relative to either side of the occupant or the vehicle or as a two-dimensional reference that uses the angle and an elevation. The gesture may be a pointing gesture in which the occupant uses a body part to point at a location in the surrounding environment. Accordingly, the search module 220 detects the motion/gesture of the occupant as an input at 430. It should be noted that while image data from a camera is described as being used to identify the gesture, in further aspects, other modalities may be implemented, such as ultrasonic, millimeter wave (MMW) radar, and so on.

As mentioned above, in some instances, an occupant may speak a command or a question that forms the basis of a search. Accordingly, in a further aspect, or alternatively, the search module 220 detects a request from the occupant(s), such as a wake word and/or a request that may be in relation to the gesture. In one embodiment, a request is an input by an occupant of the vehicle 100 that indicates a desire to perform a search (in other words, to receive information from the search system 170). A request can take various forms, for example, as a question, a statement, and/or a command. Moreover, an occupant can provide a request orally (i.e., through speaking) or digitally, for example, as a written request through a mobile device or an input system 130 of the vehicle 100. In some instances, the search module 220 detects a gesture and a request substantially simultaneously, but in other instances, the search module 220 is configured to detect a gesture and a request that are performed within a certain time period of each other.

If an occupant has not gestured and made a request, the method 400 can return to 410. If, however, an occupant has gestured and made a request, the method can continue to 430. As such, when one or more inputs are detected at 420, the search module 220 proceeds to determine, at 430, whether additional information is to be gathered at 440. Accordingly, at 430, the search module 220 determines whether to acquire additional information. Additional information, in some aspects, includes additional information about the gesture and/or the request that can help the search module 220 to resolve characteristics about the search, for example, whether the search is a map-based search, a search based on physical aspects of the vehicle 100, or another type of search. More specifically, in one configuration, the search module 220 can distinguish map-based searches, searches based on physical aspects of the vehicle 100, or general searches. As an example, a map-based search may involve requesting a nearby place to eat, asking what a particular location is that is viewable outside of the vehicle 100, and so on. A search based on physical aspects of the vehicle 100 may involve a request about whether the vehicle 100 will fit in a particular parking spot, whether the vehicle 100 is able to enter a parking garage due to size, etc. A general search may involve a request about a function of the vehicle 100 itself, for example, the function of a button in the passenger compartment.

As mentioned above, the search module 220 can distinguish between these and other types of searches using the data gathered and stored in the data store 240. The search module 220 can then use perceptions from the data to measure or otherwise assess aspects of the external environment, which may include applying known characteristics of the vehicle 100 (e.g., dimensions of the vehicle 100) or other queried information (e.g., data regarding the occupant(s)) against features identified in the external environment.

If additional information is not needed, the method 400 can proceed to 450. However, if additional information is needed, the method 400 proceeds to 440, at which the search module 220 acquires the additional information. In one approach, the search module 220 acquires additional information through the sensor system 120, and additional information can include voice data, image information, and/or other data to facilitate resolving a request from the occupant. In one embodiment, additional information includes additional image frames to resolve a direction in which the occupant gestures and/or the request. For example, if the request is initiated by an occupant pointing, then the search module 220 acquires additional information that is audio of the occupant speaking to determine specific aspects of the request related to the gesture.

While the actions associated with 410, 420, and 430 are described in relation to first acquiring data and subsequently detecting a gesture, request, and, if necessary, additional information, it should be understood that, in some instances, the search module 220 may be configured to acquire data after detection of a gesture, request, and, if necessary, additional information. Moreover, in some instances, the search module 220 may cache a broad form of the map data 260 at 410 and, after detecting a gesture, request, and, if necessary, additional information, cache a more granular form of the map data 260 based on the gesture, request, and/or additional information. In any case, upon detection of the gesture, the method 400 proceeds to 450, at which the search module 220 uses the occupant's gesture to identify the object(s) and/or area(s) of the occupant's interest.

Accordingly, at 450, the search module 220 correlates the gesture with a target, which may be the object(s) and/or area(s) of the occupant's interest. In one configuration, the target is a portion of the surrounding environment of the occupant. In other words, at 450, the search module 220 identifies a portion of the surrounding environment of the occupant towards which the occupant is gesturing. In one approach, the search module 220 uses one or more images of the gesture to determine a direction within the surrounding environment associated with the gesture. That is, the search module 220 analyzes the image data to derive a vector relative to the coordinate system of the surrounding environment. The search module 220 can then transform the gesture into a digital projection and overlay the projection, according to the vector, onto data of the surrounding environment, which can include data of the internal environment of the vehicle 100 and/or data of the external environment of the vehicle 100. Overlaying the projection onto data of the surrounding environment facilitates a determination of toward what in the surrounding environment the occupant is gesturing.

The digital projection, in one approach, is a virtual shape defining a boundary that, when overlayed onto the data of the surrounding environment, limits the portion of the environment to the target. In an example in which the occupant makes a pointing gesture toward an object in the external environment of the vehicle 100, the search module 220 derives a vector relative to the coordinate system of the external environment, transforms the gesture into a digital projection, and overlays the projection onto two-dimensional or three-dimensional map data of the external environment. Accordingly, the projection can be a two-dimensional projection or a three-dimensional projection, respectively. In either case, the map data can include data regarding a target above ground or below ground. For example, a below-ground target may be a subway station leading to an underground subway. In another example, an above-ground target may be an upper floor of a high-rise building. In an example in which the occupant makes a pointing gesture toward an object in the internal environment of the vehicle 100, the search module 220 derives a vector relative to the coordinate system of the internal environment, transforms the gesture into a digital projection, and overlays the projection onto three-dimensional data of the vehicle 100.

Whether the occupant gestures toward the external or internal environment of the vehicle 100, the projection may have various properties. In some instances, the shape of the projection is a cone that increases in size following the outward direction of the gesture, however, the shape can be other suitable shapes as well, for example, a rectangle, an arrow, etc. Moreover, the projection can have a size relative to the data that is determined, in one approach, heuristically. For example, in instances in which the vehicle 100 is traveling through the countryside, the projection may have a relatively large size to capture targets that are separated by larger, more spread-out distances. Contrariwise, in instances in which the vehicle 100 is traveling through a dense city, the projection may have a relatively small size to accommodate targets that are more closely situated to one another. Accordingly, the search module 220 can determine the size of the projection according to the surroundings of the vehicle 100, including geographic features, etc. Moreover, in instances involving three-dimensional projections, the projection may be taller than it is wide (e.g., to capture high-rises in cities) or wider than it is tall (e.g., to capture wide expanses).

In one approach, the search module 220 uses the projection to correlate the gesture with the target to identify points-of-interest (POIs) in the portion of the surrounding environment within the projection. For example, the search module 220 identifies buildings in the external environment when the occupant gestures toward the external environment. In another example, the search module 220 identifies vehicle buttons in the internal environment when the occupant gestures toward the internal environment. In some instances, the POIs are provided within a search query to limit the search results to the POIs identified in the target.

While the POIs are used to construct a search query, as mentioned above, the context of the search is also used, in this embodiment, to construct the search query. Accordingly, at 460, the search module 220 defines a context. In one embodiment, the search module 220 defines the context by generating a set of identifiers for the different aspects of the current environment, including aspects of the surroundings of the occupant (e.g., POIs, weather, traffic, etc.), the emotional state of the occupant and other occupants within the vehicle 100 (e.g., happy, angry, etc.), future plans of the occupant(s), an operating status of the vehicle 100 (e.g., location, heading, and/or speed of the vehicle 100), and so on. In general, the search module 220 defines the context to characterize the acquired information of the data such that insights can be derived from the information to improve an experience of the occupant(s). Moreover, it should be appreciated that the search module 220 can analyze the information in different ways depending on the particular context of the request, for example, depending on whether the search is a map-based search, a search based on physical aspects of the vehicle 100, etc.

As mentioned above, in one approach, at 460, the search module 220 defines an emotional state of occupant(s). The search module 220 can determine the emotional state of a driver and/or passengers individually and/or as a group. In one approach, the search module 220 applies one of the model(s) 290 that analyzes sensor data 250 to generate the estimated emotional state. In various aspects, the emotional state is derived according to a learned and/or historical view of the particular occupant(s) in order to customize the determination to, for example, different sensitivities. That is, different occupants may have sensitivities to different circumstances that elevate stress. For example, less experienced drivers may not drive on highways with the same confidence as a more experienced driver. As such, the search module 220 is able to consider these distinctions through the particular model that has learned patterns of that specific driver.

Upon correlation of the gesture with a target and definition of the context, the search module 220, in one approach, is configured to use the target and the context to perform a search based on the occupant's request. In other words, at 470, in one configuration, the search module 220 constructs a search query. In one approach, the search module 220 constructs a search query that includes various information related to the defined context, such as the emotional state of the occupant (e.g., hungry, angry, happy, etc.), correlations with POIs in the surrounding environment, and so on. In one embodiment, the search query is a language-based search query executable by a neural-network-based language model. For example, the search query is a full, grammatically correct sentence or question executable by a transformer network. The search query can be provided in English or another language.

The search module 220, in one embodiment, then executes the search query at 480 to acquire search results. In one approach, the search module 220 executes the search query by providing the search query to a model (e.g., a neural network language model) that interprets the search query and executes a search via one or more sources to generate an answer to the search query. The model may be located on board the vehicle 100 or remotely from the vehicle 100, for example, as a part of the cloud-computing environment 300 discussed above in connection with FIG. 3.

At 490, the search module 220 communicates the search results to the occupant. In various embodiments, communicating the search results may involve different actions on the part of the search module 220. For example, the search module 220 may communicate the search results using an output system 135 of the vehicle 100. The output system 135 may output the search results audibly through a sound system of the vehicle 100 and/or visually (e.g., written or pictorially) through a user interface of the vehicle 100. Additionally or alternatively, the search module 220 communicates the search results to a mobile device of an occupant, for example, the occupant who performed the search. In another example, the search module 220 communicates the search results by highlighting a feature within the vehicle 100 and/or highlighting an object and/or an area in the external environment. In yet another example, the search module 220 communicates the search results in augmented reality. Further examples of the search results can include, but are not limited to, follow-up questions, control of vehicle systems (e.g., infotainment, autonomous driving controls, etc.), and other functions operable by the search module 220.

In some instances, by way of communicating the search results to the occupant, the search module 220 provides assistance to the occupant, as indicated at 490. Assistance to the occupant can take various different forms. For example, communicating search results to the occupant can assist the occupant to acquire information and/or an improved understanding of the occupant's surroundings. In another example, communicating search results to the occupant can assist the occupant by enabling the occupant to execute an action based on the search results. In yet another example, communicating search results to the occupant can assist the occupant to gain improved control of the vehicle. In yet another example, communicating search results to the occupant can assist the occupant in planning and making decisions (e.g., where and when to shop, eat, etc.).

After performing a search, in some instances, an occupant may wish to execute an action based on the search results. For example, in an instance in which the occupant performs a search to find restaurants, the occupant may wish to make a reservation at one of the restaurants. In another example, in an instance in which the occupant performs a search to determine whether the vehicle will fit into a parking space near the vehicle, the occupant may wish to execute a parking-assist function to park the vehicle in the parking space.

Figure 5:
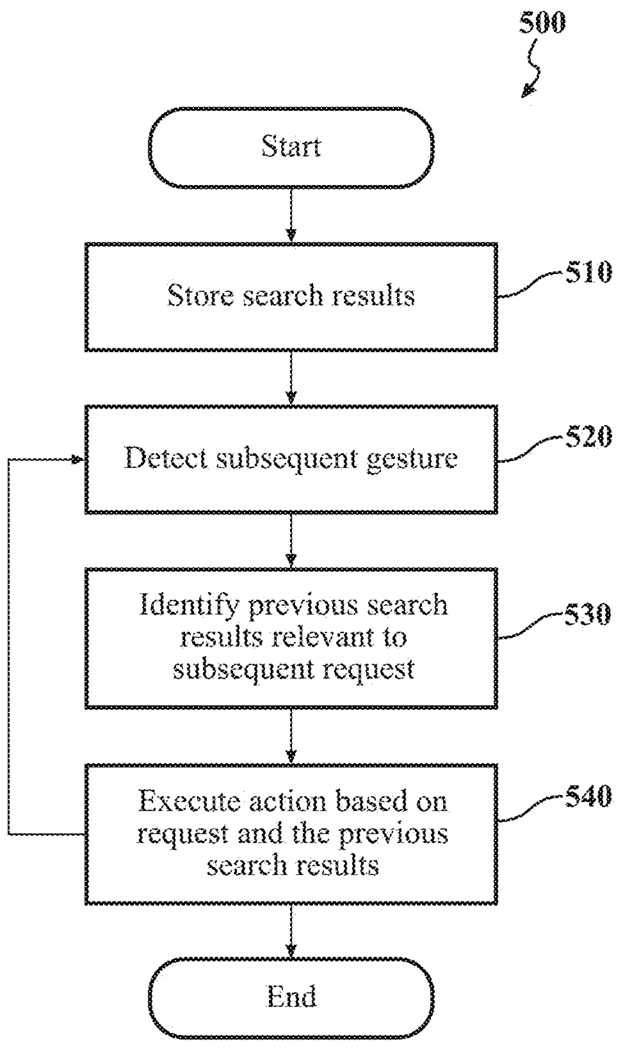
FIG. 5 illustrates a flowchart for one embodiment of a method that is associated with executing an action based on a previously-conducted context-based search within a vehicle.

Accordingly, referring now to FIG. 5, a flowchart of a method 500 that is associated with executing an action based on search results previously provided to the occupant (e.g., previous search results) is shown. In one approach, at 510, the execution module 230 stores previous search results. The execution module 230 can store previous search results iteratively as the search module 220 provides them to the occupant. In one configuration, the execution module 230 stores previous search results in the data store 240 to create a historical log of previous search results that the execution module 230 can reference later in executing an action.

At 520, the execution module 230 detects a request that is subsequent to the request made by the occupant to perform the search (e.g., a subsequent request). Like the request mentioned above in connection with performing a search, the subsequent request can take various forms, for example, a question, a statement, and/or a command. Moreover, an occupant can provide the subsequent request orally or digitally, for example, as a written request through a mobile device or an input system 130 of the vehicle 100. In some instances, the execution module 230 detects a gesture as well as the subsequent request. For example, the occupant may gesture at a target when making the subsequent request. In instances in which an occupant gestures along with making the subsequent request, the execution module 230 can detect the gesture and the subsequent request substantially simultaneously, but in other instances, the execution module 230 detects the gesture and the subsequent request within a certain time period of each other.

In some instances, the occupant may make the subsequent request right after previous search results are communicated, for example, to make a request based on the search results. In other instances, the occupant may want to reference previous search results that were communicated a few searches back, or a few minutes/hours ago, or when the vehicle 100 was located in a different position relative to the map. Accordingly, it is advantageous that the execution module 230 is able to identify which search results the occupant references when making the subsequent request.

Accordingly, at 530, in one approach, the execution module 230 identifies previous search results that are relevant to the subsequent request. As used herein, relevant previous search results include, for example, search results relating to the same topic as the subsequent request, search results communicated closely in time to the subsequent request, etc. The execution module 230, in one embodiment, identifies the relevancy of previous search results based on various factors, for example, an amount of time passed between communication of the previous search results and detection of the subsequent request, a change in location of the vehicle between the execution of the search query and the detection of the subsequent request, a change in heading of the vehicle, or other factors that may have a bearing on the relevancy of previous search results to the subsequent request. For example, if the subsequent request is a request to make a reservation at a restaurant, previous relevant search results may include a list of restaurants identified in a previously performed search. In another example, if the subsequent request is a request to park the vehicle 100 in a parking space, previous relevant search results may include parking spaces identified as spaces into which the vehicle 100 would fit based on the dimensions of the vehicle 100 and the parking space.

Upon the identification of relevant previous search results, at 540, in one approach, the execution module 230 executes an action based on the subsequent request and the relevant search results, if any. For example, if the subsequent request is a request to make a reservation at the restaurant, the execution module 230 can make a reservation at one of the previously identified restaurants. In another example, if the subsequent request is a request to park the vehicle 100 in a parking space, the execution module 230 can execute a parking-assist function to park the vehicle 100 in a previously identified parking space into which the vehicle 100 would fit.

Figure 6B:
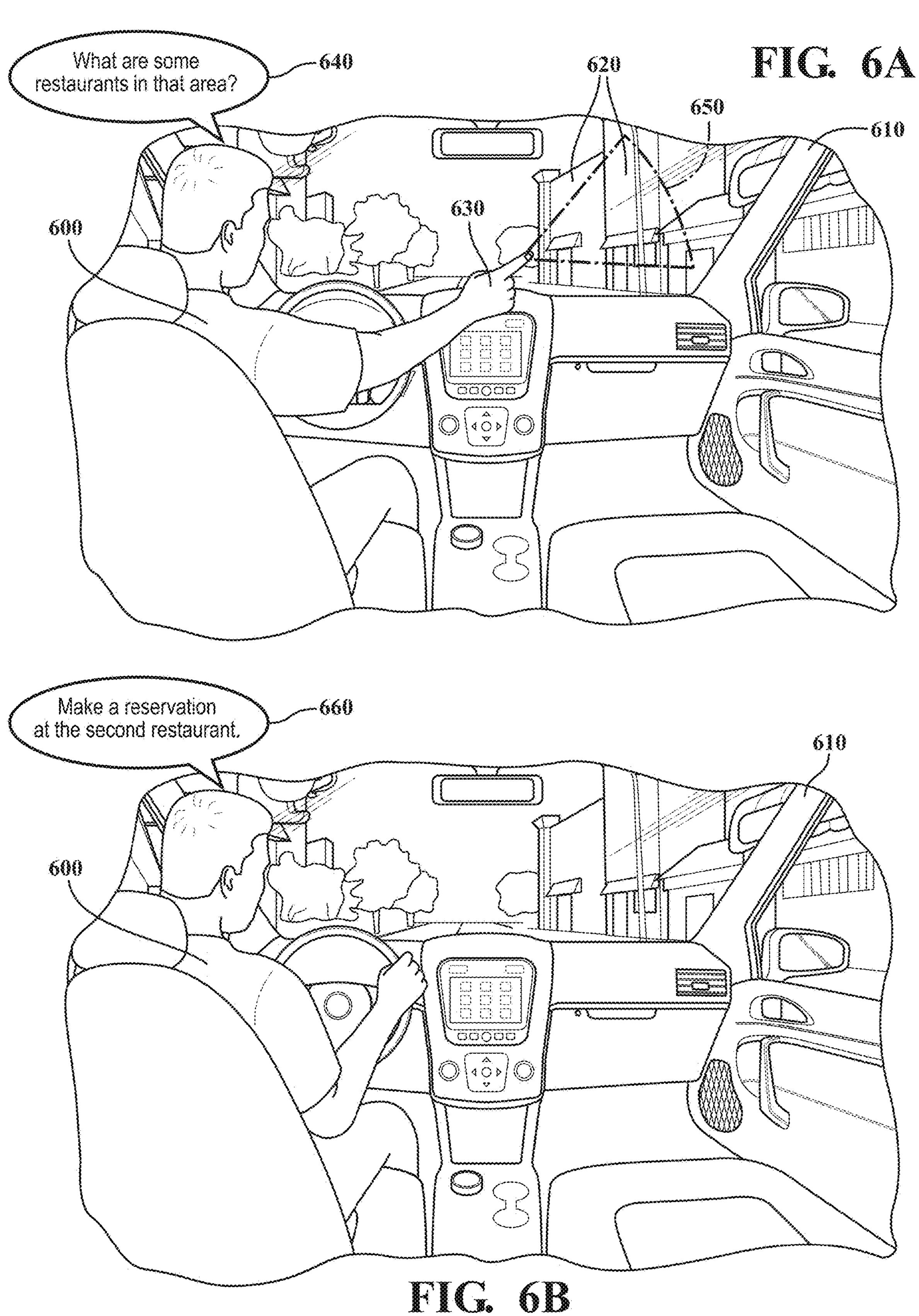
FIG. 6B illustrates an example of an occupant executing an action based on a map-based search.

Turning now to FIGS. 6A and 6B, illustrative examples of use of the search system 170 in accordance with the methods of FIGS. 5 and 6 is shown. FIGS. 6A and 6B illustrate one embodiment in which an occupant of a vehicle performs a map-based search to locate restaurants in an area near the vehicle and subsequently execute an action to make a reservation at one of the located restaurants. As shown in FIG. 6A, an occupant 600 is shown traveling in a vehicle 610 down a street lined with businesses 620. In one instance, the occupant 600 may want to know more about the businesses 620, specifically, if there are any restaurants located in the area of the businesses. As such, the occupant 600 may gesture (e.g., with a pointing gesture 630) toward the area of the businesses and make a request 640, for example, by asking, "What are some restaurants in that area?" Accordingly, in one approach, the search module 220 detects the gesture and request as an indication that the occupant 600 wishes to perform a search and subsequently correlates the pointing gesture 630 with a portion of the external environment of the vehicle 610 to determine that the occupant 600 is gesturing toward the area of the businesses, which is the target. As mentioned above, the search module 220 correlates the pointing gesture 630 with the target using a digital projection overlayed onto map data of the surrounding environment of the occupant 600. FIG. 6A shows a pictorial, representative digital projection 650 in the shape of a cone overlayed onto data of the external environment. Through use of the projection 650, the search module 220 can identify the target and limit the subsequent search query by the group of businesses.

The search module 220, in one approach, also determines the context of the search. For example, the context may include indications (e.g., from mood characterization) that the occupant 600 is happy, as well as information that there are other happy occupants in the vehicle 610. Accordingly, the search module 220 may define the context to include this information for use in the search query. An example search query constructed for the embodiment shown in FIG. 6A may thus be a full sentence asking what restaurants in the defined area of the map would be suitable for a group of happy people, for example, a group of friends. The search module 220 can thus execute this search query using a neural network language model (e.g., a LLM) to acquire search results including restaurants that would be appropriate to recommend to the occupant 600 (e.g., a list of restaurants with a fun atmosphere). The search module 220, in one approach, then communicates the search results to the occupant 600 to assist the occupant 600 to find restaurants that would provide a fun experience for the occupants.

As mentioned above, in some instances, an occupant may wish to execute an action based on the search results. FIG. 6B depicts an example of the occupant 600 of FIG. 6A executing an action based on the restaurants provided in the search results, which the execution module 230 may store in a data store 240 after communication to the occupant 600. As shown in FIG. 6B, the execution module 230, in one approach, detects a subsequent request 660. In one example, the occupant 600 makes the subsequent request 660 by stating, "Make a reservation at the second restaurant." The execution module 230 can identify previous search results that are relevant to the subsequent request (e.g., the previous list of restaurants described above in connection with FIG. 6A). In one embodiment, the execution module 230 then executes the action based on the subsequent request 660 and the previous search results. More specifically, in the present example, the execution module 230 makes a reservation at the second restaurant in the list.

Figure 7B:
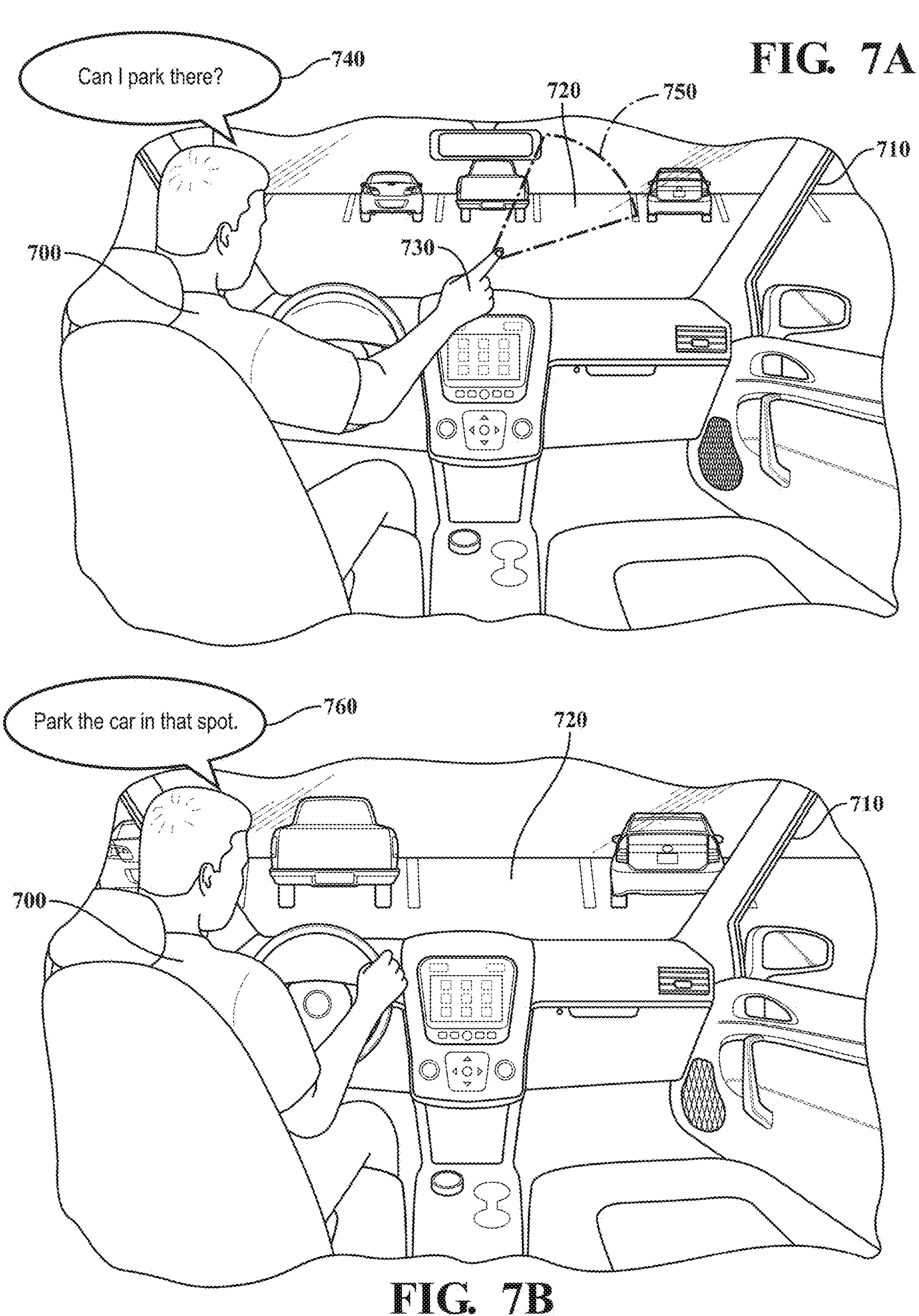
FIG. 7B illustrates an example of an occupant executing an action based on a search based on physical aspects of the vehicle.

As mentioned above, an occupant can use the search system 170 to perform not only map-based searches, but other searches based on physical aspects of a vehicle. Accordingly, FIGS. 7A and 7B show an illustrative example of use of the search system 170 in accordance with the methods of FIGS. 4 and 5 in which an occupant of a vehicle performs a search based on physical aspects of the vehicle to identify whether the vehicle can park in a parking space near the vehicle and subsequently execute an action to park the vehicle in the parking space. As shown in FIG. 7A, an occupant 700 is shown traveling in a vehicle 710 toward a parking space 720. In one instance, the occupant 700 may want to know if the vehicle 710 will fit in the parking space 720. As such, the occupant 700 may gesture (e.g., with a pointing gesture 730) toward the parking space 720 and make a request 740, for example, by asking, "Can I park there?" (meaning "Will my vehicle fit in that space?"). Accordingly, in one approach, the search module 220 detects the gesture and request as an indication that the occupant 700 wishes to perform a search, and subsequently correlate the pointing gesture 670 with a portion of the external environment of the vehicle 710 to determine that the occupant 700 is gesturing toward the parking space 720, which is the target. As mentioned above, the search module 220 correlates the pointing gesture 730 with the target using a digital projection 750 overlayed onto data of the surrounding environment of the occupant 700. Through use of the projection 750, the search module 220 can accordingly identify the target as the parking space 720.

The search module 220, in one approach, also determines the context of the search. For example, the context may include the dimensions of the vehicle 710 and the parking space 720. Accordingly, the search module 220 may define the context to include this information for use in the search query. An example search query constructed for the embodiment shown in FIG. 7A may thus be a full sentence asking if the vehicle 710 will fit in the parking space 720 based on the dimensions of the vehicle 710 and the parking space 720. The search module 220 can thus execute this search query using a neural network language model (e.g., a LLM) to acquire search results indicating whether or not the vehicle 710 will fit in the parking space 720. The search module 220, in one approach, then communicates the search results to the occupant 700 to assist the occupant 700 to park in the parking space 720.

As mentioned above, in some instances, an occupant may wish to execute an action based on the search results. FIG. 7B depicts an example of the occupant 700 of FIG. 7A executing an action based on the search results. As shown in FIG. 7B, the execution module 230, in one approach, detects a subsequent request 760. In one example, the occupant 700 makes the subsequent request 760 by stating, "Park the car in that spot." The execution module 230 can identify previous search results that are relevant to the subsequent request, for example, by identifying previous search results indicating that the vehicle 710 will fit in the parking space 720. In one embodiment, the execution module 230 then executes the action based on the subsequent request 760 and the previous search results. More specifically, in the present example, the execution module 230 activates a parking-0 assist function of the vehicle 710 to assist the occupant 700 to park in the parking space 720.

While FIGS. 7A and 7B depict one example of a search based on physical aspects of a vehicle, it should be understood that the search system 170 may be used to perform many other types of searches based on physical aspects of a vehicle. For example, an occupant may perform a search to determine whether a door of a vehicle will be able to open when the vehicle is located near an object or parked in a parking space. In another example, an occupant may perform a search to determine whether an item located outside of a vehicle will fit into the vehicle, for example, by gesturing toward the item in the external environment.

Moreover, it should be understood that while two illustrative examples of use of the search system 170 are shown in FIGS. 6A-7B, the search system 170 may be used to perform many other types of searches other than map-based searches and searches based on physical aspects of the vehicle. For example, an occupant may be able to perform a search based on the surroundings of the occupant within a vehicle, for example, based on a component of the vehicle itself. For instance, an occupant can gesture toward a vehicle component, such as a button on an instrument panel of the vehicle, to perform a search to determine the function of the button. In another example, an occupant can gesture toward a user interface of a vehicle to perform a search to receive information on various capabilities of an ADAS system of the vehicle, for example, whether the ADAS system can activate a pilot assist function, a parking assist function, etc.

Additionally, it should be noted that, while the description herein references a single occupant performing searches and executing actions, the description applies equally to embodiments in which multiple occupants perform searches and execute actions based on those searches, as well as embodiments in which one or more occupants perform searches while one or more other occupants execute actions based on those searches. Accordingly, in one configuration, the search module 220 and/or the execution module 230 is equipped to distinguish various occupants in a vehicle, including which occupant(s) perform searches and which occupant(s) execute actions based on those searches.

Figure 8:
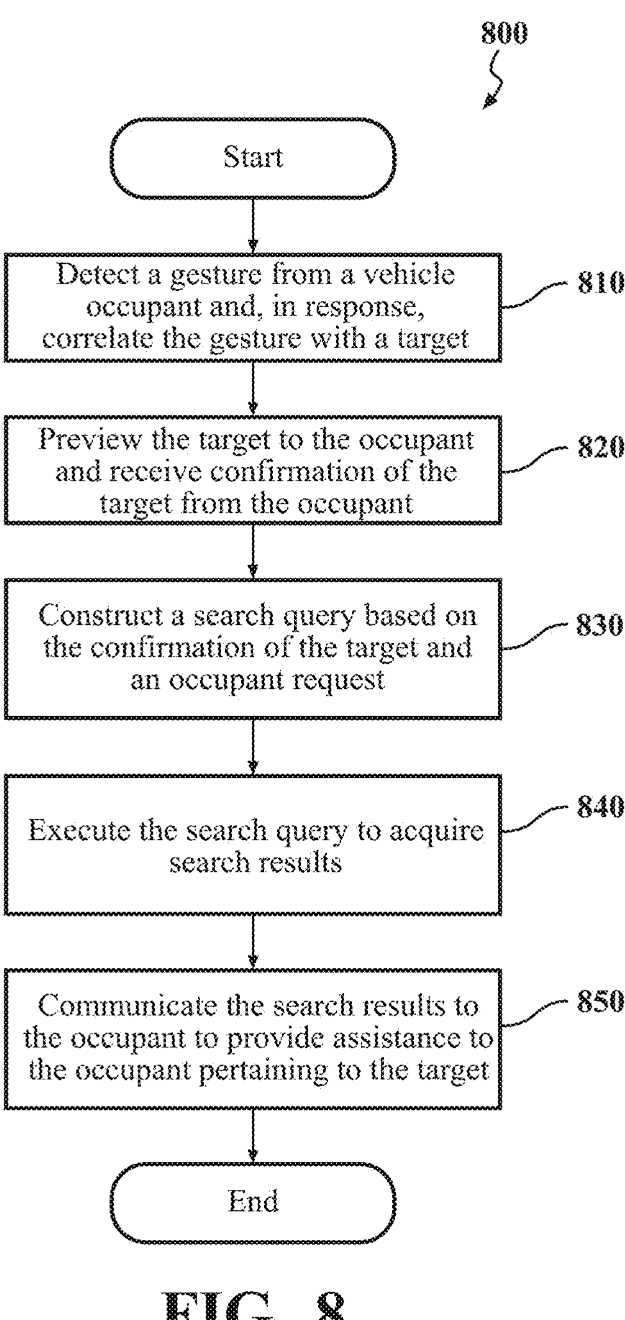
FIG. 8 is a flowchart of one embodiment of a method of vehicle-based searching that includes occupant confirmation of the target.

FIG. 8 is a flowchart of one embodiment of a method 800 of vehicle-based searching that includes occupant confirmation of the target. Method 800 will be discussed from the perspective of the search system 170 in FIGS. 1-3. While method 800 is discussed in combination with the search system 170, it should be appreciated that method 800 is not limited to being implemented within the search system 170, but the search system 170 is instead one example of a system that may implement method 800.

Some aspects of method 800, particularly how search module 220 identifies, through projection and overlaying, the target in the external or internal environment of vehicle 100 to which the occupant's gesture and request refer, are discussed in greater detail above in connection with FIG. 4. Consequently, those details are not repeated in the discussion of method 800 below.

At block 810, search module 220, in response to detecting a gesture performed by an occupant of a vehicle 100, correlates the gesture with a target. As discussed above, a "target" is an object (animate or inanimate), location, building, vehicle feature/control, point-of-interest, etc., in the external or internal environment of a vehicle 100 to which an occupant's gesture refers. In other words, the search module 220 determines to what in the external or internal environment of vehicle 100 the occupant's gesture refers. Since the occupant's associated request also refers to the target, the occupant's request can also be correlated with the occupant's gesture to assist search module 220 in identifying the target. For example, if an occupant points at a building in a group of closely spaced buildings along the side of a roadway and says, "What time does that restaurant open for dinner?", search module 220 can combine geometric analysis of image data or other sensor data from sensor system 120 based on projection and overlaying, as described elsewhere herein (see, e.g., the discussion of FIG. 4), with the occupant's request that refers to a "restaurant" to determine that, of the five closely spaced businesses in the direction of the occupant's gesture, the one the occupant intended is "Ray's Steakhouse" because it is the only restaurant in the group of five businesses.

At block 820, search module 220 previews the target to the occupant and receives confirmation of the target from the occupant. As discussed above, in some embodiments, search module 220 previews the target to the occupant and receives confirmation of the target from the occupant. That is, search module 220 requests confirmation of the target from the occupant before performing a search. For example, in some embodiments, the system generates and outputs an audible computer-synthesized natural-language question or statement as a preview of the presumptive target to the occupant to request confirmation. The occupant can then confirm the target through a spoken natural-language reply or through the actuation of a user-interface element of the vehicle (button, switch, knob, lever, icon, etc.), as explained above. In other embodiments, search module 220 previews the tentatively identified target to the occupant by displaying a captured image of the environment (external or internal) that includes the presumptive target and outputs an associated computer-synthesized natural-language question or statement to which the occupant responds in a natural-language format to confirm the target, as described above. Examples of use cases involving occupant confirmation are discussed below in connection with FIGS. 9A-9D.

As also described above, in some situations, an occupant might gesture and utter a request that the search module 220 cannot resolve with high confidence due to inherent ambiguity. In such situations, search module 220 can disambiguate the occupant's gesture through follow-up natural-language dialogue (e.g., the occupant provides a natural-language description of the intended target, such as, "I'm talking about the white car in the middle") or through asking the occupant to touch or tap a displayed image of a plurality of objects of like type or category to indicate the intended target among the plurality of similar objects. In summary, in some embodiments, in addition to requesting and obtaining confirmation of the target from the occupant, search module 220 can also interact with the occupant textually, audibly, visually, and/or tactilely to disambiguate the target, if necessary.

At block 830, search module 220 constructs a search query based on the confirmation of the target and an occupant request. As discussed above, once search module 220 has gathered the requisite information, search module 220 constructs a search query. For example, in some embodiments, the search system constructs the search query based on the defined context, the target correlated with the occupant's gesture, and the occupant's request, as described above in connection with method 400. In other words, the search query can include contextual clues and can be directed to the points-of-interest or other target within the digital projection, based on sensor data 250. In embodiments that include occupant confirmation of the target before the search is executed, the search system constructs the search query based on the confirmation of the target received from the occupant and the occupant's request. In some embodiments, contextual information can also be incorporated in the query, as in method 400 (refer to the discussion of FIG. 4 above). As discussed above, in some embodiments, a captured image of the environment that includes the confirmed target is used as the basis for constructing a search query that includes a reverse image search. That is, the search query can be based on the confirmation of the target, the occupant's request, and a reverse image search of the portion of the captured image that corresponds to the confirmed target. Again, contextual information can also be included in the query, in some embodiments.

At block 840, search module 220 executes the search query to acquire search results. As discussed above, subsequent to construction of the search query, the search module 220 then executes the search query. In one example, the search module 220 executes the search query by inputting the search query to a multi-modal generative-AI-based model.

At block 850, search module 220 communicates the search results to the occupant to provide assistance to the occupant pertaining to the target. Accordingly, the systems and methods disclosed herein provide the benefit of constructing search queries that return more accurate and/or relevant results to an occupant of a vehicle who performs a gesture-based search. For example, an occupant can point at a business and ask, "What time does that store close today?" After correlating the occupant's gesture with a target (the business), previewing the target to the occupant, receiving confirmation of the target as being Max's Sporting Goods, constructing a search query, and executing the search query, the search module 220 can, through computer-synthesized natural-language speech, inform the occupant, "Max's Sporting Goods is open until 8 p.m. this evening." Such information permits the occupant to conduct a shopping trip more effectively and obtain needed merchandise.

In some embodiments, the actions described above in connection with method 500 can be performed in combination with method 800. That is, the techniques described in connection with method 500 to execute an action based on an occupant request and previous search results can be used in conjunction with method 800.

In some embodiments, other actions can be added to method 800. For example, in some embodiments, search module 220, in response to detecting the gesture performed by the occupant of the vehicle 100, captures an image that includes the target. The captured image can be used in various ways, depending on the embodiment. For example, such a captured image (e.g., captured by a camera 126 of the vehicle 100) can be used in previewing the target to the occupant and, if needed, in disambiguating the intended target, where the target is among a plurality of objects of like type or category, as described above.

Some illustrative use cases of a search system 170 that includes occupant target confirmation and target disambiguation will next be discussed in connection with FIGS. 9A-9D and 10A-10C.

FIG. 9A illustrates an example of an occupant 900 performing a gesture-based search regarding an object in the environment. In this example, the occupant 900 is driving a vehicle 910 in a parking lot, where the occupant 900 sees a particular parked vehicle (the rightmost of three vehicles in the scene, target 920) that he is interested in knowing more about. The occupant 900 points (pointing gesture 930) at the target 920 and says, "What kind of car is that?" (occupant request 940). Search module 220 analyzes a projection 950 overlaid on captured image data from a camera 126 of the vehicle 100 to identify the likely target 920 (the rightmost vehicle of the three vehicles the occupant 900 can see). The search module 220 has thus correlated the occupant's gesture with the target 920, as discussed above.

Figure 9B:
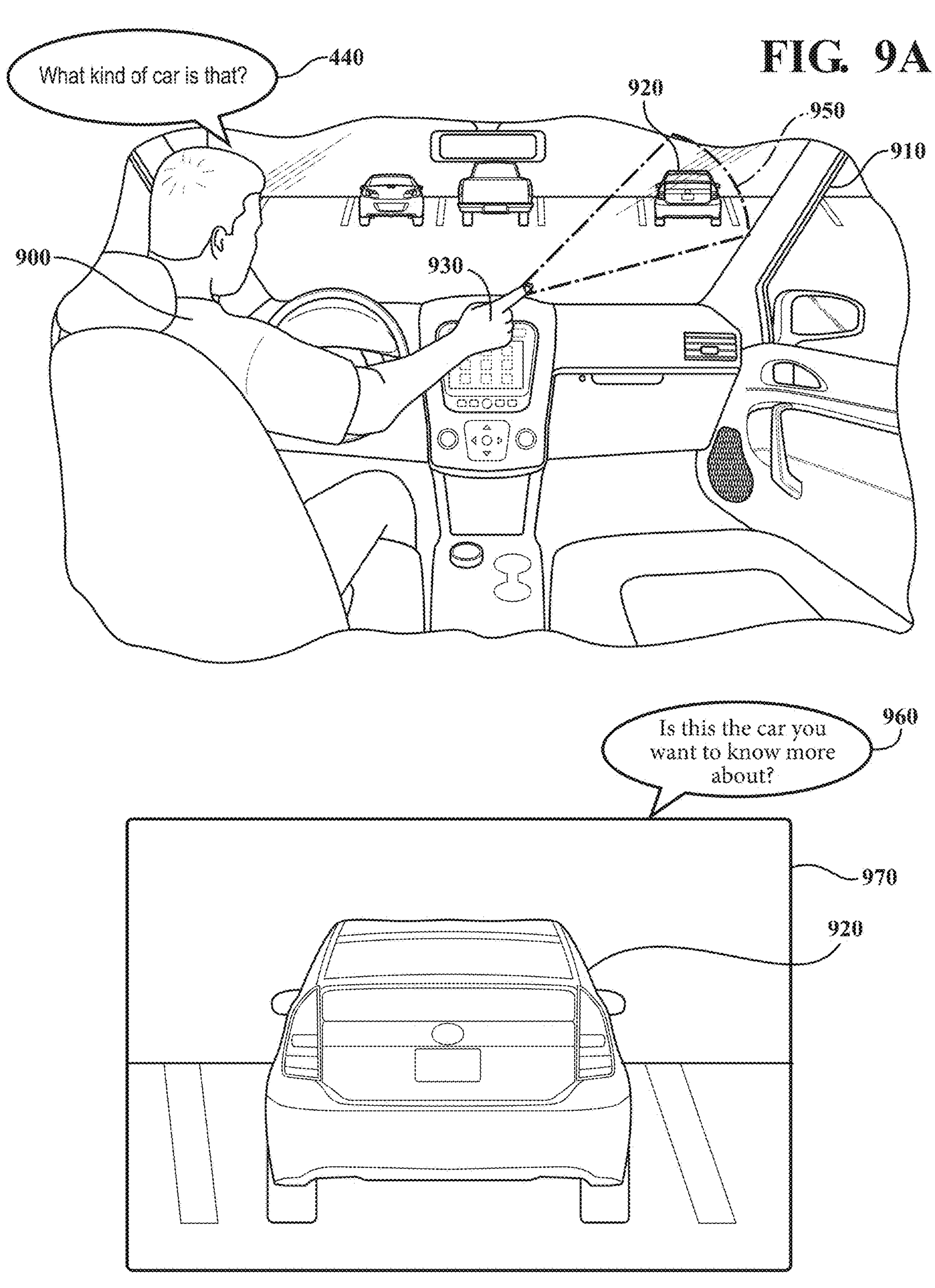
FIG. 9B illustrates an example of displaying, to the occupant, a captured image of a tentative target and requesting that the occupant confirm the target before the search query is executed.

FIG. 9B illustrates an example of displaying, to the occupant 900, a captured image of a tentative target and requesting that the occupant confirm the target 920 before the search query is executed. In FIG. 9B, an image of the target 920 (the rightmost vehicle in FIG. 9A) is displayed to the occupant 900 on a display 970 (e.g., a dashboard display, HUD, or occupant mobile device), and search module 220 generates and outputs the natural-language system confirmation request 960, "Is this the car you want to know more about?" The occupant 900 can then respond with a natural-language reply such as, "Yes, that's correct," or the occupant 900 can actuate a user-interface element (e.g., switch, button, knob, icon, etc.) to confirm the target 920. Once search module 220 has received confirmation of the target 920 from the occupant 900, search module 220 can construct a search query based on the confirmation of the target 920 and the accompanying spoken request ("What kind of car is that?"), execute the search query to acquire search results, and communicate the search results to the occupant 900 to provide assistance to the occupant 900 pertaining to the target 920. For example, the search module 220, after executing the query, which, in some embodiments, can include a reverse image search of the vehicle (target 920) based on image data, can provide natural-language search results such as, "That car is a 2017 Toyota Camry").

Figures 9C, 9D:
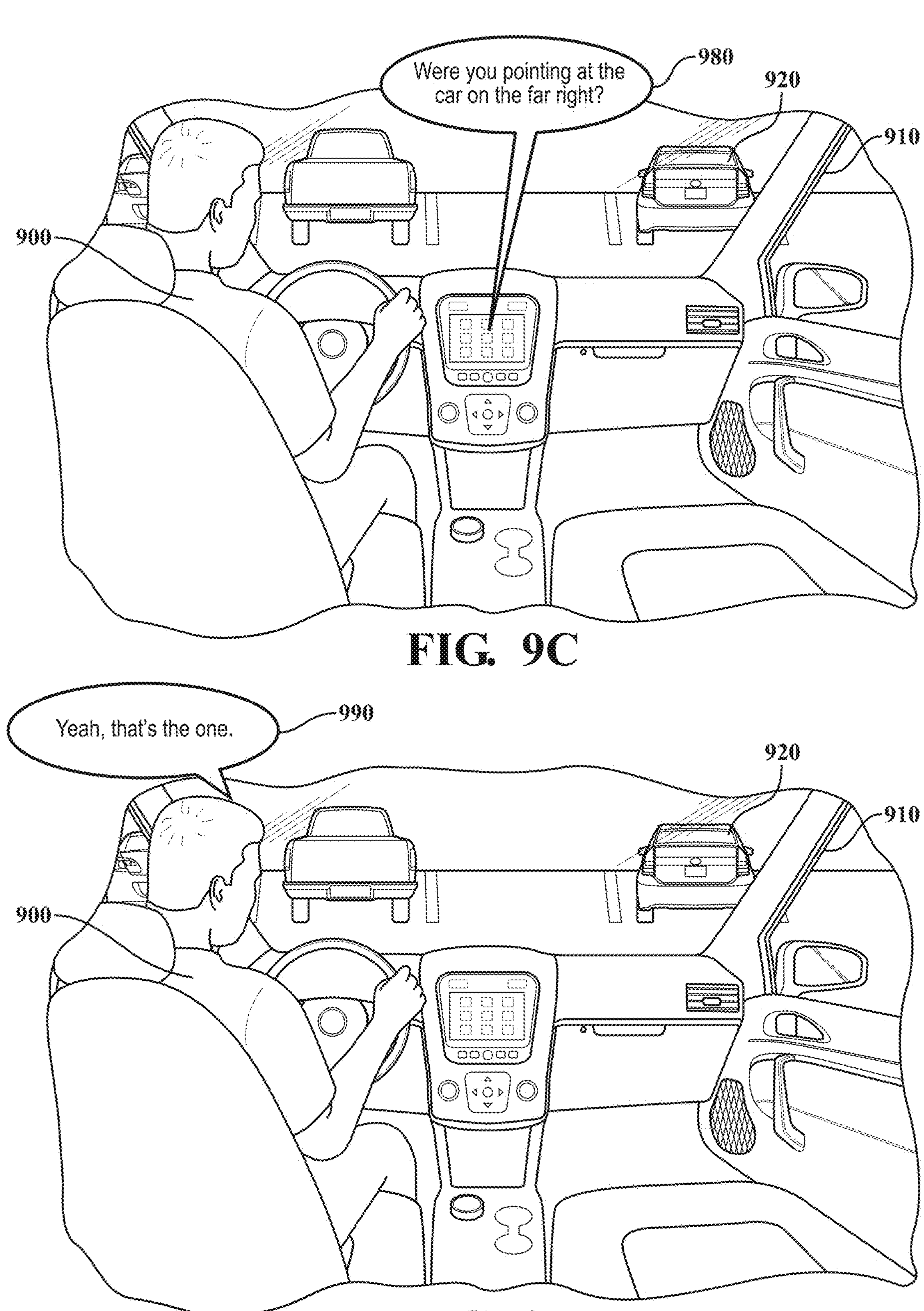
FIG. 9C illustrates an example of a vehicle search system requesting, via a natural-language request, that the occupant confirm the target before the search query is executed.
FIG. 9D illustrates an example of the occupant responding to the confirmation request in FIG. 9C.

FIG. 9C illustrates an example of a vehicle search system requesting, via a natural-language system confirmation request 980, that the occupant 900 confirm the target 920 before the search query is executed. In this example, as in FIG. 9A, search module 220 has determined with a high level of confidence that the vehicle toward which the occupant 900 was gesturing is the rightmost vehicle in the scene (target 920). Instead of presenting an image of the tentative target to the occupant for confirmation, search module 220, in this embodiment, instead generates and outputs a natural-language system confirmation request 980, "Were you pointing at the car on the far right?" As illustrated in FIG. 9D, the occupant 900 then responds, "Yeah, that's the one." This example illustrates that search module 220 can obtain confirmation of the target from the occupant via natural-language follow-up dialogue without displaying a captured image.

Figure 10A:
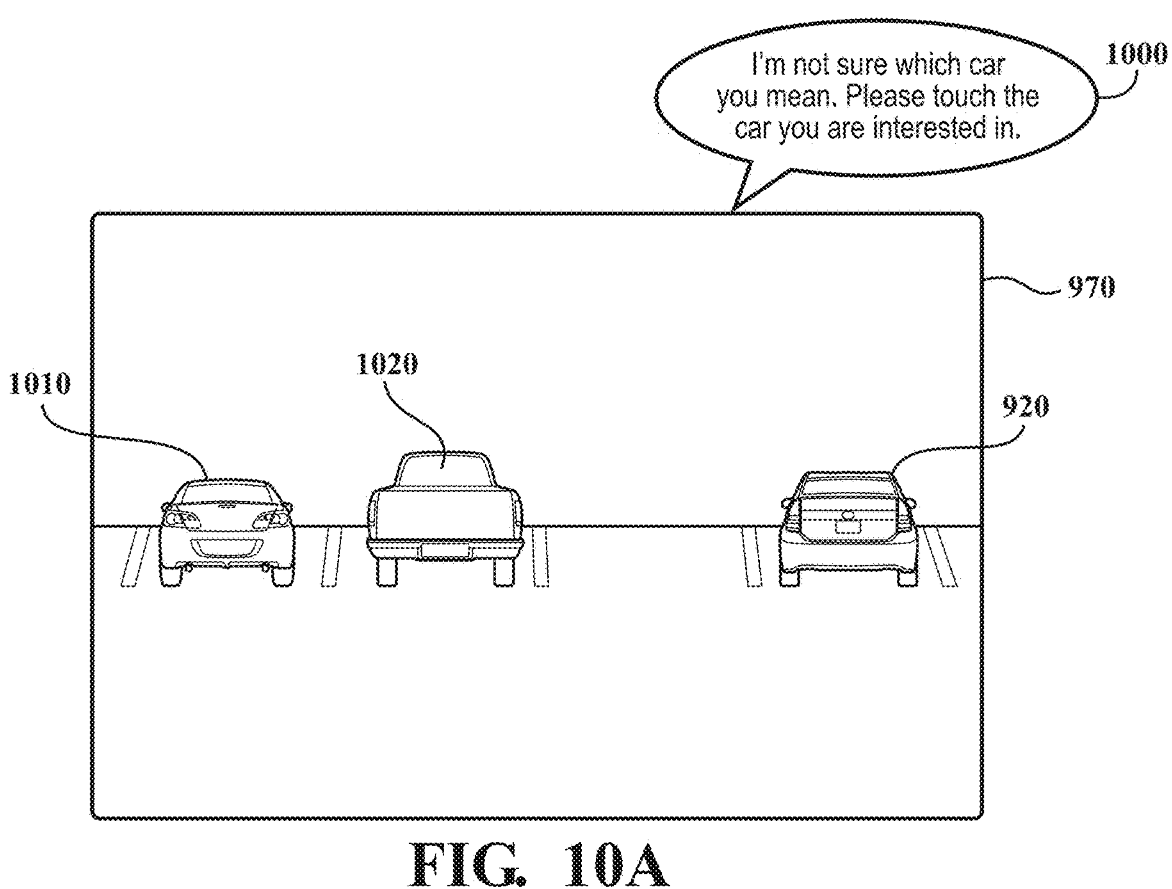
FIG. 10A illustrates an example of requesting that the occupant disambiguate the target by touching the target on a displayed image of the environment.
Figure 10B:
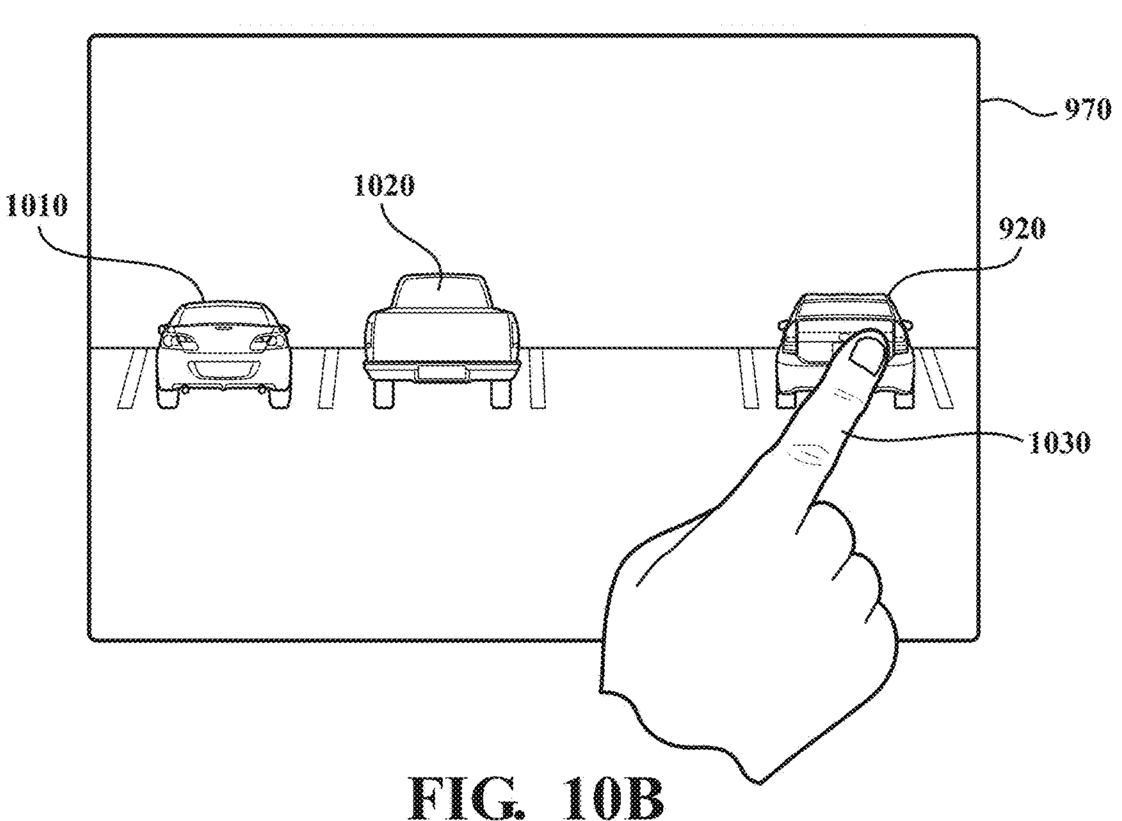
FIG. 10B illustrates an example of the occupant touching the intended target in the displayed image in response to the disambiguation request from the search system in FIG. 10A.

FIG. 10A illustrates an example of requesting that the occupant disambiguate the target by touching the target 920 on a displayed image of the environment. In the example of FIG. 10A, the scenario is similar to that in FIG. 9A, except that, in this case, search module 220 is unable to determine with a high level of confidence, based on the occupant's gesture, which of the three vehicles in the scene (vehicle 1010, vehicle 1020, or target 920) the occupant 900 was pointing at. In response, search module 220 generates and outputs the system disambiguation request 1000, "I'm not sure which car you mean. Please touch the car you are interested in." Search module 220 presents to the occupant 900, on a touch-responsive display 970, an image of the environment that includes all three vehicles (vehicle 1010, vehicle 1020, and the rightmost vehicle, the occupant's intended target 920). As illustrated in FIG. 10B, the occupant 900 disambiguates the target 920 by simply touching the touch-responsive display 970 at a location within the displayed image that corresponds to the target 920 (see occupant touch-disambiguation 1030 in FIG. 10B). Based on this occupant touch-disambiguation 1030, search module 220 can proceed to construct and execute a search query and to communicate, to the occupant 900, the results of the search query.

Figure 10C:
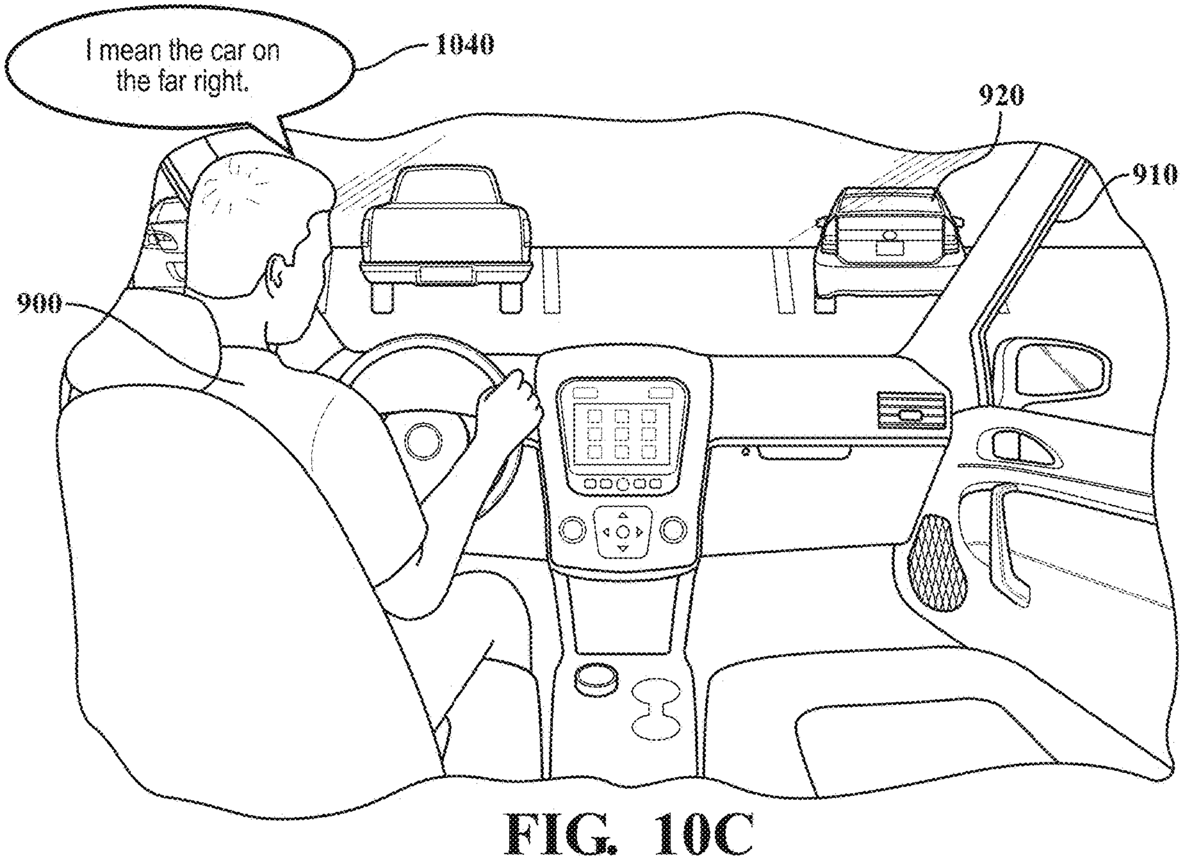
FIG. 10C illustrates an example of the occupant responding to a disambiguation request in a natural-language format.

FIG. 10C illustrates an example of the occupant 900 responding to a disambiguation request in a natural-language format. In the example of FIG. 10C, the scenario is again similar to that in FIG. 9A. As in the example of FIG. 10A, search module 220 is again unable to determine with a high level of confidence, based on the occupant's gesture, which of the three vehicles in the scene (vehicle 1010, vehicle 1020, or target 920) the occupant 900 was pointing at when he said, "What kind of car is that?" In this embodiment, search module 220, instead of presenting an image of the possible targets and requesting that the occupant 900 disambiguate the target 920 via touch, uses natural-language follow-up dialogue with the occupant 900. For example, the search module 220 might generate and output a system disambiguation request like, "I'm sorry, but I couldn't tell which of the three cars you were pointing at just now." As shown in FIG. 10C, the occupant 900 can then respond with the occupant natural-language disambiguation 1040, "I mean the car on the far right." With this natural-language disambiguation and confirmation of the target 920, search module 220 proceeds to construct and execute a search query and to communicate, to the occupant 900, the results of the search query.

Figure 11:
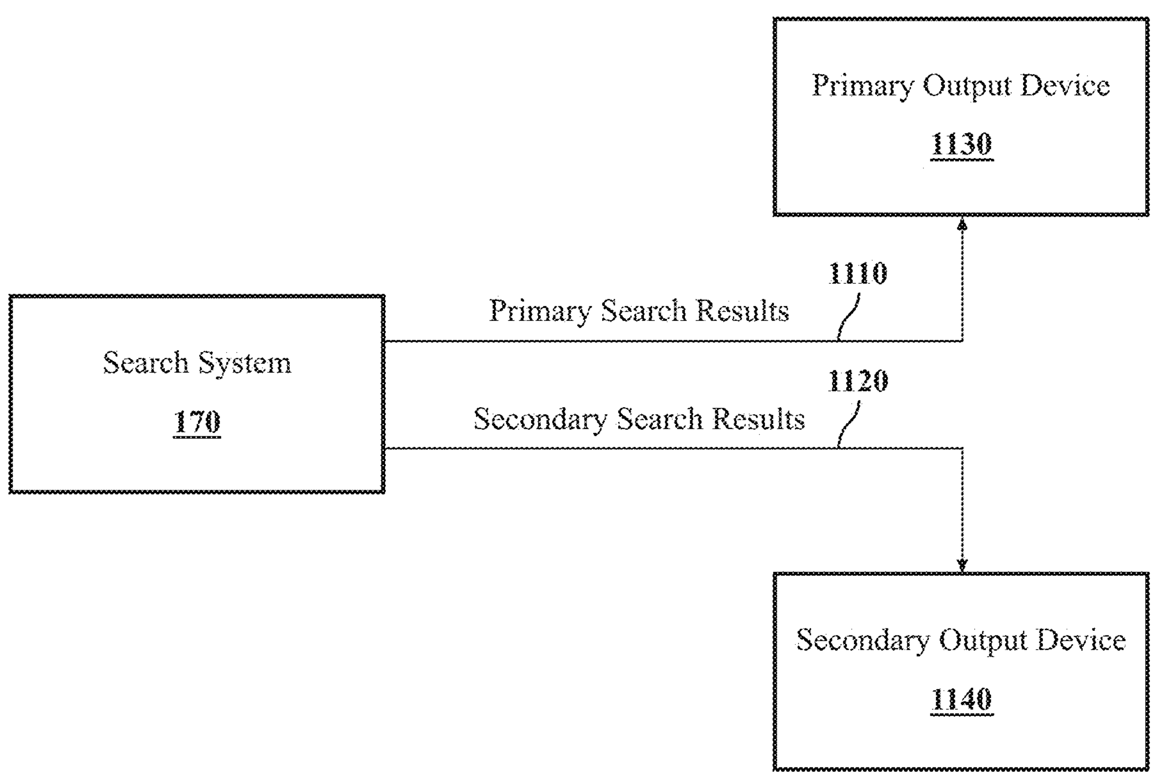
FIG. 11 is a block diagram of one embodiment of a vehicle search system that outputs primary and secondary search results of different scope to, respectively, a primary output device and a secondary output device.

FIG. 11 is a block diagram of one embodiment of a vehicle search system 170 (refer to FIGS. 2 and 3) that outputs primary and secondary search results of different scope to, respectively, a primary output device and a secondary output device. Similar to the embodiments discussed above, in the embodiments pertaining to FIG. 11, search module 220 includes machine-readable instructions that, when executed by the one or more processors 110, cause the one or more processors 110, in response to detecting a gesture performed by an occupant of a vehicle, to correlate the gesture with a target, construct a search query based on the target correlated with the gesture and an occupant request, and execute the search query to acquire search results.

In embodiments pertaining to FIG. 11, search module 220 includes additional machine-readable instructions that, when executed by the one or more processors 110, cause the one or more processors 110 to process the search results to generate primary search results 1110 and secondary search results 1120, the primary and secondary search results being different in scope, as discussed above. In these embodiments, search module 220 also includes machine-readable instructions that, when executed by the one or more processors 110, cause the one or more processors 110 to communicate the primary and secondary search results (1110 and 1120) to the occupant via a primary output device 1130 and a secondary output device 1140, respectively, to provide assistance to the occupant pertaining to the target.

As explained above, the primary search results 1110 and the secondary search results 1120 are different in scope. For example, the primary search results 1110 might be a succinct (e.g., one-sentence), high-level statement that includes the most important information sought by the occupant (e.g., a driver or passenger), and the secondary search results 1120 might include more detail—in some embodiments, significantly more detail. The additional detail can assist an occupant who is attempting to research a particular topic while driving or riding in a vehicle. Thus, in some embodiments, the secondary search results 1120 are more detailed than the primary search results 1110. As those skilled in the art will recognize, however, the terms "primary" and "secondary," as used herein, are arbitrary ways of identifying, for purposes of description, two different sets of information derived from the original search results that have different scope and that are separately communicated to the occupant to assist the occupant pertaining to the target of the search.

In one embodiment pertaining to FIG. 11, search module 220, in communicating the primary search results 1110 to the occupant, outputs a computer-synthesized natural-language statement via an output system 135 of the vehicle 100 that includes the primary output device (e.g., an audio system including one or more speakers). An example of this functionality is discussed further below in connection with FIG. 13A. In other embodiments pertaining to FIG. 11, the primary output device 1130 is some type of display (e.g., for displaying a brief textual message) that is part of the vehicle's output system 135.

As discussed above, in some embodiments pertaining to FIG. 11, the secondary output device 1140 is a cloud server (e.g., cloud-computing environment 300 in FIG. 3), an occupant mobile device, an occupant laptop computer, an occupant desktop computer, or the output system 135 of the vehicle 100. Regarding the last possibility just mentioned, in some embodiments, in communicating the secondary search results 1120 to the occupant, search module 220 displays the secondary search results 1120 via the output system 135 of vehicle 100 when the vehicle 100 is parked. This illustrates that, in some embodiments, primary output device 1130 and secondary output device 1140 are separate, different output devices, and, in other embodiments, they are both part of the output system 135 of the vehicle 100. Where the occupant initiating the search is the driver, this is done for safety reasons (i.e., so the driver will not attempt to read detailed textual search results on, e.g., an IVIS display of the vehicle 100 while driving). If the occupant who initiated the search is a passenger, however, this restriction can be lifted, in some embodiments.

In some embodiments pertaining to FIG. 11, search module 220, in processing the search results to generate the primary search results 1110, uses a generative-AI-based text summarization algorithm. Such an algorithm can be helpful in generating a succinct summary of the overall search results that provides the most important information the occupant is seeking. An example of such primary search results 1110 is discussed below in connection with FIG. 13A.

It should be noted that, in embodiments pertaining to FIG. 11, there can be multiple secondary output devices 1140 (e.g., a cloud server and an occupant mobile device). In some embodiments, the primary search results 1110 and secondary search results 1120 are stored in a cloud server and downloaded, as needed, to an app running on the occupant's secondary output device 1140 (e.g., a mobile device, laptop computer, or desktop computer). In some embodiments, the app just mentioned is integrated with the operating system of the secondary output device 1140. Also, in some embodiments, search module 220 transmits the primary 1110 and/or secondary 1120 search results to the primary output device 1130 and/or the secondary output device 1140 via text messages and/or e-mail.

As mentioned above, some embodiments pertaining to FIG. 11 include an additional feature: receiving a natural-language request from the occupant to capture an image of a particular portion of the external or internal environment of the vehicle 100, capturing the image in accordance with the natural-language request from the occupant, and transmitting the captured image to a secondary output device 1140. For example, a vehicle occupant might see a beautiful sunset and ask the search system 170 to capture an image of the sunset and to transmit the image to the occupant's designated secondary device 1140 (e.g., the occupant's smartphone). Similarly, an occupant might ask the search system 170 to capture a selfie of the vehicle occupants using a passenger-compartment camera 126 and to transmit the image to a designated secondary device 1140 (e.g., occupant's mobile device or a cloud server where the occupant stores personal photos).

Figure 12:
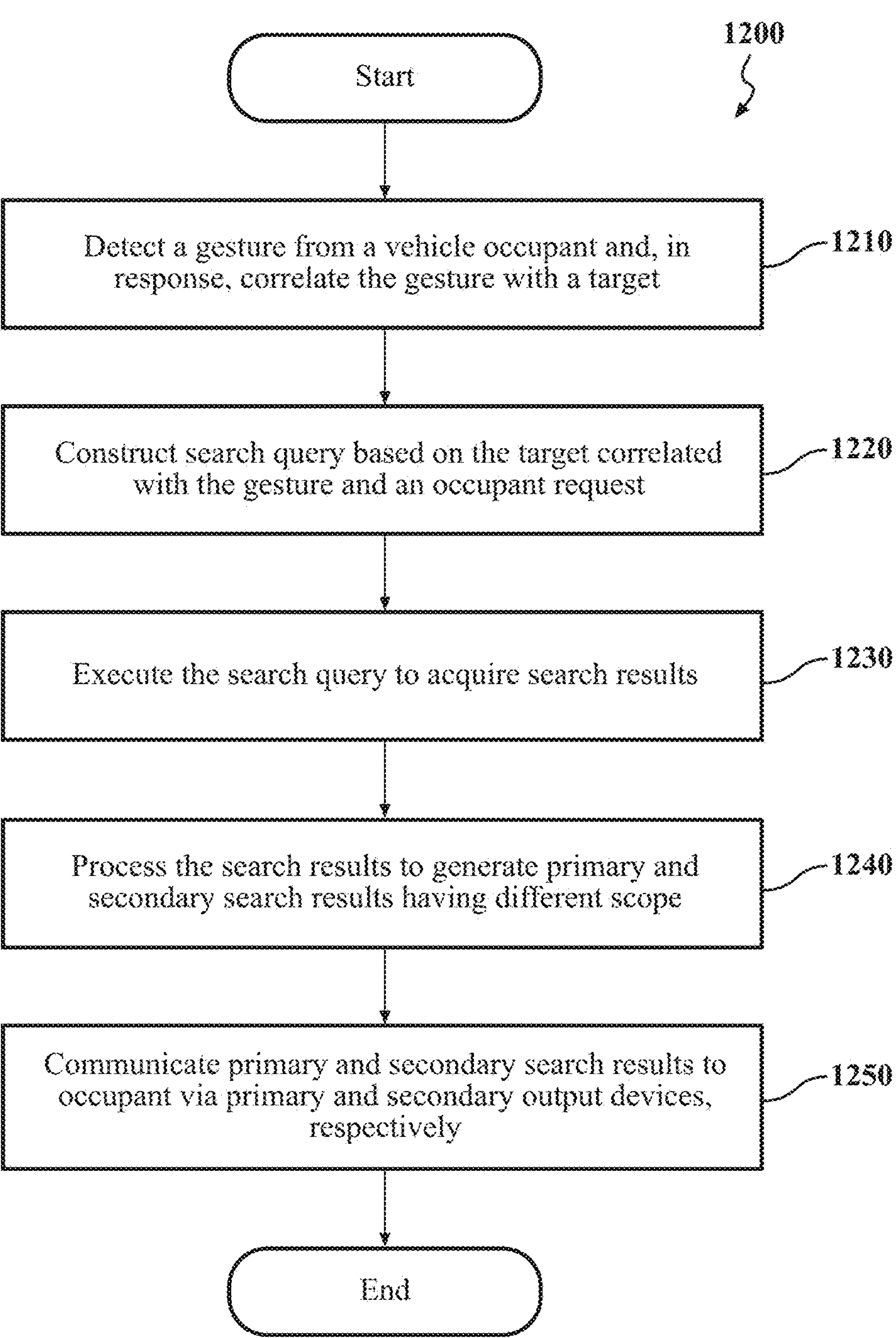
FIG. 12 is a flowchart of one embodiment of a method of vehicle-based searching that includes the outputting of primary and secondary search results of different scope to, respectively, a primary output device and a secondary output device.

FIG. 12 is a flowchart of one embodiment of a method 1200 of vehicle-based searching that includes the outputting of primary and secondary search results of different scope to, respectively, a primary output device and a secondary output device. Method 1200 will be discussed from the perspective of the search system 170 in FIGS. 1-3 and 11. While method 1200 is discussed in combination with the search system 170, it should be appreciated that method 1200 is not limited to being implemented within the search system 170, but the search system 170 is instead one example of a system that may implement method 1200.

At block 1210, search module 220, in response to detecting a gesture performed by an occupant of a vehicle 100, correlates the gesture with a target, as discussed above in connection with FIGS. 4 and 8.

At block 1220, search module 220 constructs a search query based on the target correlated with the gesture and an occupant request, as discussed above in connection with FIGS. 4 and 8.

At block 1230, search module 220 executes the search query to acquire search results, as discussed above in connection with FIGS. 4 and 8.

At block 1240, search module 220 processes the search results to generate primary search results 1110 and secondary search results 1120. As explained above, the primary search results 1110 and the secondary search results 1120 are different in scope. For example, the primary search results 1110 might be a succinct (e.g., one-sentence), high-level statement that includes the most important information sought by the occupant (e.g., a driver or passenger), and the secondary search results 1120 might include more detail—in some embodiments, significantly more detail. The additional detail can assist an occupant who is attempting to research a particular topic while driving or riding in a vehicle. Thus, in some embodiments, the secondary search results 1120 are more detailed than the primary search results 1110.

At block 1250, search module 220 communicates the primary and secondary search results to the occupant via a primary output device 1130 and a secondary output device 1140, respectively, to provide assistance to the occupant pertaining to the target. As explained above, in some embodiments, primary output device 1130 is part of or an aspect of an output system 135 of the vehicle 100. Examples include, without limitation, an audio system including one or more audio speakers or a display for displaying text and/or graphics.

In some embodiments, method 1200 includes additional actions not shown in FIG. 12. Several examples of such embodiments follow.

In one embodiment pertaining to the method 1200, search module 220, in communicating the primary search results 1110 to the occupant, outputs a computer-synthesized natural-language statement via an output system 135 of the vehicle 100 that includes the primary output device (e.g., an audio system that includes one or more speakers). An example of this functionality is discussed further below in connection with FIG. 13A. In other embodiments pertaining to method 1200, the primary output device 1130 is some type of display (e.g., for displaying a brief textual message) that is part of the vehicle's output system 135.

As discussed above, in some embodiments pertaining to method 1200, the secondary output device 1140 is a cloud server (e.g., cloud-computing environment 300 in FIG. 3), an occupant mobile device, an occupant laptop computer, an occupant desktop computer, or the output system 135 of the vehicle 100. Regarding the last possibility just mentioned, in some embodiments, in communicating the secondary search results 1120 to the occupant, search module 220 displays the secondary search results 1120 via the output system 135 of vehicle 100 when the vehicle 100 is parked. This illustrates that, in some embodiments, primary output device 1130 and secondary output device 1140 are separate, different output devices, and, in other embodiments, they are both part of the output system 135 of the vehicle 100. Where the occupant initiating the search is the driver, this is done for safety reasons (i.e., so the driver will not attempt to read detailed textual search results on, e.g., an IVIS display of the vehicle 100 while driving). If the occupant who initiated the search is a passenger, however, this restriction can be lifted, in some embodiments.

In some embodiments pertaining to method 1200, search module 220, in processing the search results to generate the primary search results 1110, uses a generative-AI-based text summarization algorithm. Such an algorithm can be helpful in generating a succinct summary of the overall search results that provides the most important information the occupant is seeking. An example of such primary search results 1110 is discussed below in connection with FIG. 13A.

It should be noted that, in embodiments pertaining to method 1200, there can be multiple secondary output devices 1140 (e.g., a cloud server and an occupant mobile device). In some embodiments, the primary search results 1110 and secondary search results 1120 are stored in a cloud server and downloaded, as needed, to an app running on the occupant's secondary output device 1140 (e.g., a mobile device, laptop computer, or desktop computer). In some embodiments, the app just mentioned is integrated with the operating system of the secondary output device 1140. Also, in some embodiments, search module 220 transmits the primary 1110 and/or secondary 1120 search results to the primary output device 1130 and/or the secondary output device 1140 via text messages and/or e-mail.

As mentioned above, some embodiments pertaining to method 1200 include an additional feature: receiving a natural-language request from the occupant to capture an image of a particular portion of the external or internal environment of the vehicle 100, capturing the image in accordance with the natural-language request from the occupant, and transmitting the captured image to a secondary output device 1140. For example, a vehicle occupant might see a beautiful sunset and ask the search system 170 to capture an image of the sunset and to transmit the image to the occupant's designated secondary device 1140 (e.g., the occupant's smartphone). Similarly, an occupant might ask the search system 170 to capture a selfie of the vehicle occupants using a passenger-compartment camera 126 and to transmit the image to a designated secondary device 1140 (e.g., occupant's mobile device or a cloud server where the occupant stores personal photos).

Figure 13A:
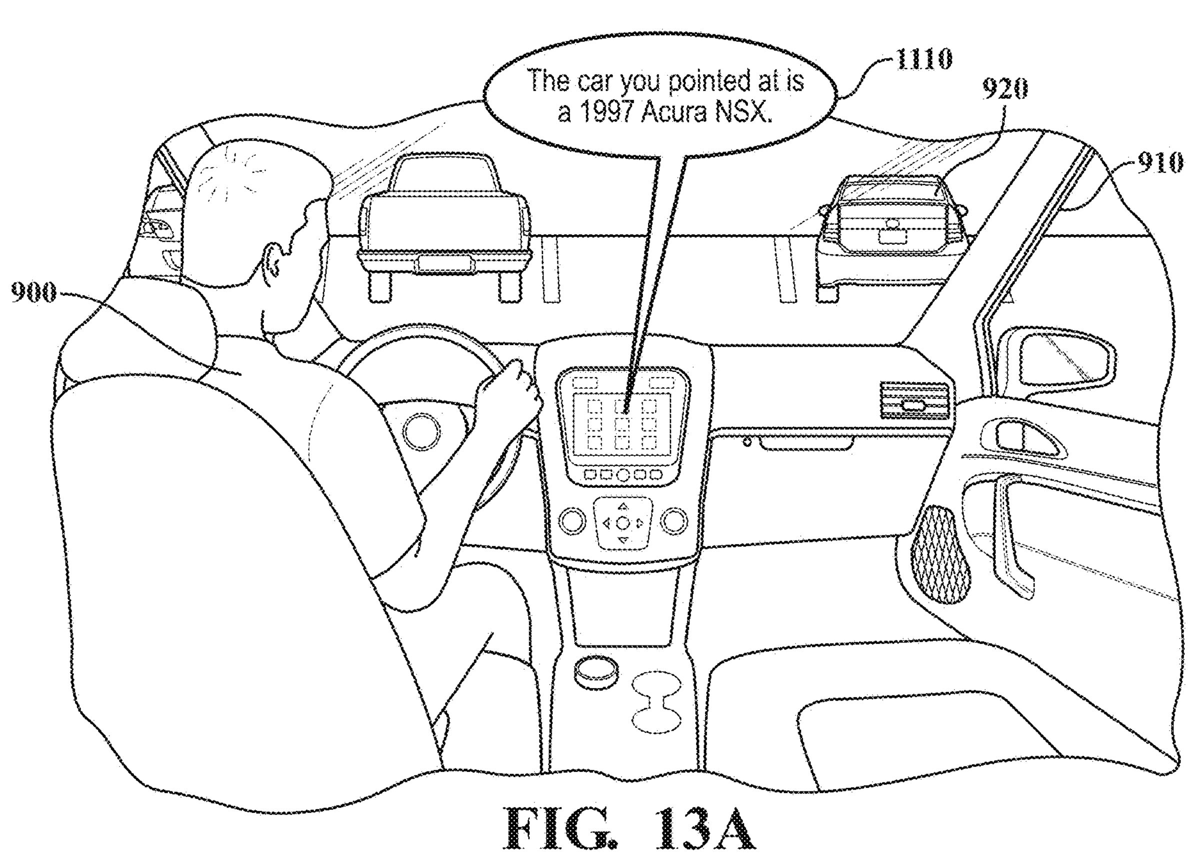
FIG. 13A illustrates an example of a vehicle search system outputting primary search results via a primary output device.

FIG. 13A illustrates an example of a vehicle search system 170 outputting primary search results 1110 via a primary output device 1130. In FIG. 13A, the scenario is the same as in FIG. 9A: the occupant 900 points at a particular vehicle (target 920) parked in a parking lot and asks, "What kind of car is that?" In this example, search module 220 constructs a query and acquires search results as described above in connection with FIGS. 2, 4, 8, 11, and 12. From the initial search results, search module 220 generates primary search results 1110, as discussed above. In this example, primary search results 1110 consist of a short computer-synthesized natural-language statement, "The car you pointed at is a 1997 Acura NSX." This provides the occupant 900 with the essential information the occupant was looking for. This brief, high-level summary minimizes the distraction of the occupant 900 (the driver, in this example).

Figure 13B:
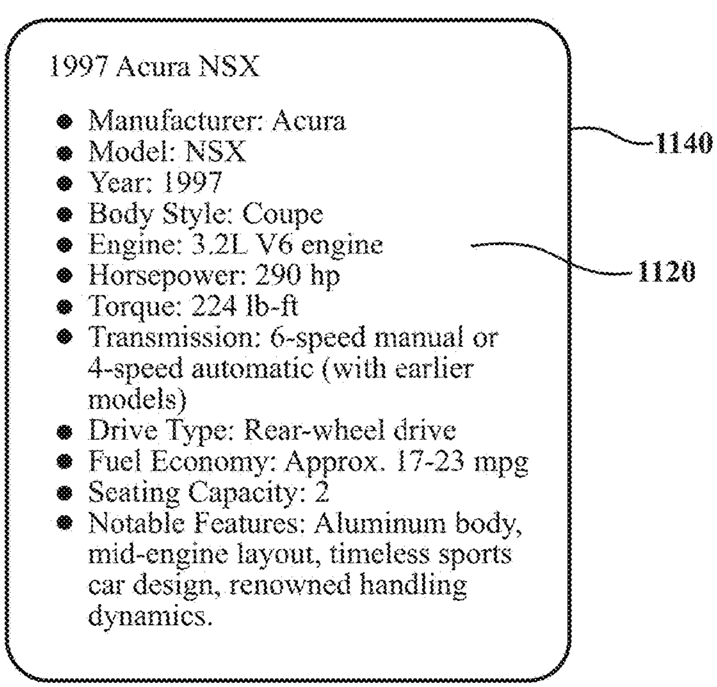
FIG. 13B illustrates an example of a vehicle search system outputting secondary search results via a secondary output device.

FIG. 13B illustrates an example of a vehicle search system 170 outputting secondary search results 1120 via a secondary output device 1140. FIG. 13B relates to the same scenario as FIG. 13A (i.e., that of FIG. 9A). FIG. 13B shows secondary search results 1120 displayed on the screen of an occupant's secondary output device 1140 (e.g., a smartphone or tablet-computer). The secondary search results 1120 in FIG. 13B are much more detailed than the brief primary search results 1110 illustrated in FIG. 13A. The occupant 900 can view these much more detailed secondary search results 1120 at his leisure to more deeply research the vehicle in which he is interested. As mentioned above, if the vehicle is parked, the occupant 900 (the driver of the vehicle 100) can view the secondary search results 1120 on a vehicle display (e.g., an IVIS display in the dashboard).

The embodiments pertaining to FIGS. 11-13B concerning the communication, to the occupant, of primary and secondary search results can be combined, in various configurations, with the other gesture-based search techniques described above in connection with the discussion of FIGS. 2-5, 6A-7B, and 8-10C.

FIG. 1 will now be discussed in full detail as an example environment within which the system and methods disclosed herein may operate. In some instances, the vehicle 100 is configured to switch selectively between an autonomous mode, one or more semi-autonomous modes, and/or a manual mode. "Manual mode" means that all of or a majority of the control and/or maneuvering of the vehicle is performed according to inputs received via manual human-machine interfaces (HMIs) (e.g., steering wheel, accelerator pedal, brake pedal, etc.) of the vehicle 100 as manipulated by a user (e.g., human driver). In one or more arrangements, the vehicle 100 can be a manually-controlled vehicle that is configured to operate in only the manual mode.

In one or more arrangements, the vehicle 100 implements some level of automation in order to operate autonomously or semi-autonomously. As used herein, automated control of the vehicle 100 is defined along a spectrum according to the SAE J3016 standard. The SAE J3016 standard defines six levels of automation from level zero to five. In general, as described herein, semi-autonomous mode refers to levels zero to two, while autonomous mode refers to levels three to five. Thus, the autonomous mode generally involves control and/or maneuvering of the vehicle 100 along a travel route via a computing system to control the vehicle 100 with minimal or no input from a human driver. By contrast, the semi-autonomous mode, which may also be referred to as advanced driving assistance system (ADAS), provides a portion of the control and/or maneuvering of the vehicle via a computing system along a travel route with a vehicle operator (i.e., driver) providing at least a portion of the control and/or maneuvering of the vehicle 100.

With continued reference to the various components illustrated in FIG. 1, the vehicle 100 includes one or more processors 110. In one or more arrangements, the processor(s) 110 can be a primary/centralized processor of the vehicle 100 or may be representative of many distributed processing units. For instance, the processor(s) 110 can be an electronic control unit (ECU). Alternatively, or additionally, the processors include a central processing unit (CPU), a graphics processing unit (GPU), an ASIC, a microcontroller, a system on a chip (SoC), and/or other electronic processing units that support operation of the vehicle 100.

The vehicle 100 can include one or more data stores 115 for storing one or more types of data. The data store 115 can be comprised of volatile and/or non-volatile memory. Examples of memory that may form the data store 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drivers (SSDs), and/or other non-transitory electronic storage medium. In one configuration, the data store 115 is a component of the processor(s) 110. The data store 115 is operatively connected to the processor(s) 110 for use thereby. The term "operatively connected," as used throughout this description, can include direct or indirect connections, including connections without direct physical contact.

In one or more arrangements, the one or more data stores 115 include various data elements to support functions of the vehicle 100, such as semi-autonomous and/or autonomous functions. Thus, the data store 115 may store map data 116 and/or sensor data 119. The map data 116 includes, in at least one approach, maps of one or more geographic areas. In some instances, the map data 116 can include information about roads (e.g., lane and/or road maps), traffic control devices, road markings, structures, features, and/or landmarks in the one or more geographic areas. The map data 116 may be characterized, in at least one approach, as a high-definition (HD) map that provides information for autonomous and/or semi-autonomous functions.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. In one or more arrangements, the map data 116 includes one or more static obstacle maps 118. The static obstacle map(s) 118 can include information about one or more static obstacles located within one or more geographic areas. A "static obstacle" is a physical object whose position and general attributes do not substantially change over a period of time. Examples of static obstacles include trees, buildings, curbs, fences, and so on.

The sensor data 119 is data provided from one or more sensors of the sensor system 120. The sensor data 119 may include observations of a surrounding environment of the vehicle 100 and/or information about the vehicle 100 itself.

In some instances, one or more data stores 115 located onboard the vehicle 100 store at least a portion of the map data 116 and/or the sensor data 119. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. As described herein, "sensor" means an electronic and/or mechanical device that generates an output (e.g., an electric signal) responsive to a physical phenomenon, such as electromagnetic radiation (EMR), sound, etc. The sensor system 120 and/or the one or more sensors can be operatively connected to the processor(s) 110, the data store(s) 115, and/or another element of the vehicle 100.

Various examples of different types of sensors will be described herein. However, it will be understood that the embodiments are not limited to the particular sensors described. In various configurations, the sensor system 120 includes one or more vehicle sensors 121 and/or one or more environment sensors. The vehicle sensor(s) 121 function to sense information about the vehicle 100 itself. In one or more arrangements, the vehicle sensor(s) 121 include one or more accelerometers, one or more gyroscopes, an inertial measurement unit (IMU), a dead-reckoning system, a global navigation satellite system (GNSS), a global positioning system (GPS), and/or other sensors for monitoring aspects about the vehicle 100.

As noted, the sensor system 120 can include one or more environment sensors 122 that sense a surrounding environment (e.g., external) of the vehicle 100 and/or, in at least one arrangement, an environment of a passenger cabin of the vehicle 100. For example, the one or more environment sensors 122 sense objects the surrounding environment of the vehicle 100. Such obstacles may be stationary objects and/or dynamic objects. Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 includes one or more radar sensors 123, one or more LIDAR sensors 124, one or more sonar sensors 125 (e.g., ultrasonic sensors), and/or one or more cameras 126 (e.g., monocular, stereoscopic, RGB, infrared, etc.).

Furthermore, the vehicle 100 includes, in various arrangements, one or more vehicle systems 140. Various examples of the one or more vehicle systems 140 are shown in FIG. 1. However, the vehicle 100 can include a different arrangement of vehicle systems. It should be appreciated that although particular vehicle systems are separately defined, each or any of the systems or portions thereof may be otherwise combined or segregated via hardware and/or software within the vehicle 100. As illustrated, the vehicle 100 includes a propulsion system 141, a braking system 142, a steering system 143, a throttle system 144, a transmission system 145, a signaling system 146, and a navigation system 147.

The navigation system 147 can include one or more devices, applications, and/or combinations thereof to determine the geographic location of the vehicle 100 and/or to determine a travel route for the vehicle 100. The navigation system 147 can include one or more mapping applications to determine a travel route for the vehicle 100 according to, for example, the map data 116. The navigation system 147 may include or at least provide connection to a global positioning system, a local positioning system or a geolocation system.

In one or more configurations, the vehicle systems 140 function cooperatively with other components of the vehicle 100. For example, the processor(s) 110, the search system 170, and/or automated driving module(s) 160 can be operatively connected to communicate with the various vehicle systems 140 and/or individual components thereof. For example, the processor(s) 110 and/or the automated driving module(s) 160 can be in communication to send and/or receive information from the various vehicle systems 140 to control the navigation and/or maneuvering of the vehicle 100. The processor(s) 110, the search system 170, and/or the automated driving module(s) 160 may control some or all of these vehicle systems 140.

For example, when operating in the autonomous mode, the processor(s) 110, the search system 170, and/or the automated driving module(s) 160 control the heading and speed of the vehicle 100. The processor(s) 110, the search system 170, and/or the automated driving module(s) 160 cause the vehicle 100 to accelerate (e.g., by increasing the supply of energy/fuel provided to a motor), decelerate (e.g., by applying brakes), and/or change direction (e.g., by steering the front two wheels). As used herein, "cause" or "causing" means to make, force, compel, direct, command, instruct, and/or enable an event or action to occur either in a direct or indirect manner.

As shown, in one configuration, the vehicle 100 includes one or more actuators 150. The actuators 150 are, for example, elements operable to move and/or control a mechanism, such as one or more of the vehicle systems 140 or components thereof responsive to electronic signals or other inputs from the processor(s) 110 and/or the automated driving module(s) 160. The one or more actuators 150 may include motors, pneumatic actuators, hydraulic pistons, relays, solenoids, piezoelectric actuators, and/or another form of actuator that generates the desired control.

As described previously, the vehicle 100 can include one or more modules, at least some of which are described herein. In at least one arrangement, the modules are implemented as non-transitory computer-readable instructions that, when executed by the processor 110, implement one or more of the various functions described herein. In various arrangements, one or more of the modules are a component of the processor(s) 110, or one or more of the modules are executed on and/or distributed among other processing systems to which the processor(s) 110 is operatively connected. Alternatively, or in addition, the one or more modules are implemented, at least partially, within hardware. For example, the one or more modules may be comprised of a combination of logic gates (e.g., metal-oxide-semiconductor field-effect transistors (MOSFETs)) arranged to achieve the described functions, an application-specific integrated circuit (ASIC), programmable logic array (PLA), field-programmable gate array (FPGA), and/or another electronic hardware-based implementation to implement the described functions. Further, in one or more arrangements, one or more of the modules can be distributed among a plurality of the modules described herein. In one or more arrangements, two or more of the modules described herein can be combined into a single module.

Furthermore, the vehicle 100 may include one or more automated driving modules 160. The automated driving module(s) 160, in at least one approach, receive data from the sensor system 120 and/or other systems associated with the vehicle 100. In one or more arrangements, the automated driving module(s) 160 use such data to perceive a surrounding environment of the vehicle. The automated driving module(s) 160 determine a position of the vehicle 100 in the surrounding environment and map aspects of the surrounding environment. For example, the automated driving module(s) 160 determines the location of obstacles or other environmental features including traffic signs, trees, shrubs, neighboring vehicles, pedestrians, etc.

The automated driving module(s) 160 either independently or in combination with the system 170 can be configured to determine travel path(s), current autonomous driving maneuvers for the vehicle 100, future autonomous driving maneuvers and/or modifications to current autonomous driving maneuvers based on data acquired by the sensor system 120 and/or another source. In general, the automated driving module(s) 160 functions to, for example, implement different levels of automation, including advanced driving assistance (ADAS) functions, semi-autonomous functions, and fully autonomous functions, as previously described.

The arrangements disclosed herein provide the benefit of constructing context-based search queries to return more accurate and/or relevant results to an occupant of a vehicle who performs a search. The arrangements disclosed herein also provide the benefit of constructing search queries informed not only by context, but also by correlation of a gesture forming the basis of a search with a portion of the surrounding environment of an occupant performing the gesture.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-13B, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. The systems, components and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:

a processor; and a memory storing machine-readable instructions that, when executed by the processor, cause the processor to:

in response to detecting a gesture performed by an occupant of a vehicle, correlate the gesture with a target;

construct a search query based on the target correlated with the gesture and an occupant request;

execute the search query to acquire search results;

process the search results to generate primary search results and secondary search results, wherein the primary and secondary search results are different in scope and processing the search results to generate the primary search results includes using a generative-artificial-intelligence-based text summarization algorithm; and communicate the primary and secondary search results to the occupant via a primary output device and a secondary output device, respectively, to provide assistance to the occupant pertaining to the target, wherein, for safety reasons, when the secondary search results are communicated via an output system of the vehicle, the secondary search results are displayed via the output system of the vehicle only after the vehicle is parked.

2. The system of claim 1, wherein the secondary search results are more detailed than the primary search results.

3. The system of claim 1, wherein the machine-readable instructions to communicate the primary search results to the occupant include instructions that, when executed by the processor, cause the processor to output a computer-synthesized natural-language statement via an output system of the vehicle that includes the primary output device.

4. The system of claim 1, wherein the secondary output device is one of a cloud server, an occupant mobile device, an occupant laptop computer, an occupant desktop computer, and an output system of the vehicle.

5. The system of claim 1, wherein the machine-readable instructions include further instructions that, when executed by the processor, cause the processor to:

receive a natural-language request from the occupant to capture an image of a particular portion of one of an external environment of the vehicle and an internal environment of the vehicle;

capture the image in accordance with the natural-language request from the occupant; and transmit the captured image to the secondary output device.

6. A non-transitory computer-readable medium storing instructions that, when executed by a processor, cause the processor to:

in response to detecting a gesture performed by an occupant of a vehicle, correlate the gesture with a target;

construct a search query based on the target correlated with the gesture and an occupant request;

execute the search query to acquire search results;

process the search results to generate primary search results and secondary search results, wherein the primary and secondary search results are different in scope and processing the search results to generate the primary search results includes using a generative-artificial-intelligence-based text summarization algorithm; and communicate the primary and secondary search results to the occupant via a primary output device and a secondary output device, respectively, to provide assistance to the occupant pertaining to the target, wherein, for safety reasons, when the secondary search results are communicated via an output system of the vehicle, the secondary search results are displayed via the output system of the vehicle only after the vehicle is parked.

7. The non-transitory computer-readable medium of claim 6, wherein the secondary search results are more detailed than the primary search results.

8. The non-transitory computer-readable medium of claim 6, wherein the instructions to communicate the primary search results to the occupant include instructions that, when executed by the processor, cause the processor to output a computer-synthesized natural-language statement via an output system of the vehicle that includes the primary output device.

9. The non-transitory computer-readable medium of claim 6, wherein the secondary output device is one of a cloud server, an occupant mobile device, an occupant laptop computer, an occupant desktop computer, and an output system of the vehicle.

10. A method, comprising:

in response to detecting a gesture performed by an occupant of a vehicle, correlating the gesture with a target;

constructing a search query based on the target correlated with the gesture and an occupant request;

executing the search query to acquire search results;

processing the search results to generate primary search results and secondary search results, wherein the primary and secondary search results are different in scope and processing the search results to generate the primary search results includes using a generative-artificial-intelligence-based text summarization algorithm; and communicating the primary and secondary search results to the occupant via a primary output device and a secondary output device, respectively, to provide assistance to the occupant pertaining to the target, wherein, for safety reasons, when the secondary search results are communicated via an output system of the vehicle, the secondary search results are displayed via the output system of the vehicle only after the vehicle is parked.

11. The method of claim 10, wherein the secondary search results are more detailed than the primary search results.

12. The method of claim 10, wherein the primary search results are communicated to the occupant as a computer-synthesized natural-language statement via an output system of the vehicle that includes the primary output device.

13. The method of claim 10, wherein the secondary output device is one of a cloud server, an occupant mobile device, an occupant laptop computer, an occupant desktop computer, and an output system of the vehicle.

14. The method of claim 10, further comprising:

receiving a natural-language request from the occupant to capture an image of a particular portion of one of an external environment of the vehicle and an internal environment of the vehicle;

capturing the image in accordance with the natural-language request from the occupant; and transmitting the captured image to the secondary output device.

* * * * *